US010947877B2

United States Patent
Ishihara et al.

(10) Patent No.: US 10,947,877 B2
(45) Date of Patent: Mar. 16, 2021

(54) EXHAUST GAS PURIFICATION FILTER

(71) Applicant: DENSO CORPORATION, Kariya (JP)

(72) Inventors: Mikio Ishihara, Kariya (JP); Syusaku Yamamura, Kariya (JP); Akira Miyashita, Kariya (JP); Hironori Niwa, Kariya (JP)

(73) Assignee: DENSO CORPORATION, Kariya (JP)

( * ) Notice: Subject to any disclaimer, the term of this patent is extended or adjusted under 35 U.S.C. 154(b) by 585 days.

(21) Appl. No.: 15/561,683

(22) PCT Filed: Mar. 7, 2016

(86) PCT No.: PCT/JP2016/056918
§ 371 (c)(1),
(2) Date: Sep. 26, 2017

(87) PCT Pub. No.: WO2016/158210
PCT Pub. Date: Oct. 6, 2016

(65) Prior Publication Data
US 2018/0080355 A1 Mar. 22, 2018

(30) Foreign Application Priority Data

Mar. 27, 2015 (JP) .............................. JP2015-066567
Jan. 29, 2016 (JP) ................................. 2016-015584

(51) Int. Cl.
*F01N 3/022* (2006.01)
*F01N 3/28* (2006.01)
(Continued)

(52) U.S. Cl.
CPC ....... *F01N 3/0222* (2013.01); *B01D 39/2068* (2013.01); *B01D 46/247* (2013.01);
(Continued)

(58) Field of Classification Search
CPC .............. F01N 3/0222; B01D 39/2068; B01D 46/2418; B01D 46/2451; B01D 46/247
(Continued)

(56) References Cited

U.S. PATENT DOCUMENTS 4,505,107 A * 3/1985 Yamaguchi ............. F01N 3/027
55/283
5,245,825 A * 9/1993 Ohhashi ............. B01D 53/9454
219/552
(Continued)

FOREIGN PATENT DOCUMENTS

JP 61-113915 5/1986
JP 2003-35126 2/2003
(Continued)

OTHER PUBLICATIONS

Co-pending U.S. Appl. No. 15/207,810 (35 pgs.).

*Primary Examiner* — Minh Chau T Pham
(74) *Attorney, Agent, or Firm* — Nixon & Vanderhye P.C.

(57) ABSTRACT

An exhaust gas purification filter has a honeycomb structure body and upstream side plug members. Cell holes are composed of inlet cell holes and outlet cell holes. In a central area and an outer peripheral area, a gas flow channel cross sectional area Sc1 of the outlet cell holes is larger than a gas flow channel cross sectional area So1 of the inlet cell holes, where Sc1<So1. A first ratio Rc is smaller than a second ratio Ro. The first ratio Rc is a ratio of Sc1 and Sc2. The second ratio Ro is a ratio of So1 to So2. In a first direction X and a second direction Y, the inlet cell holes and the outlet cell holes are alternately arranged, and the cell walls in the central area are larger in thickness than the cell walls in the outer peripheral area.

7 Claims, 12 Drawing Sheets

(51) Int. Cl.
  *B01D 53/94* (2006.01)
  *B01J 35/04* (2006.01)
  *B01D 39/20* (2006.01)
  *B01D 46/24* (2006.01)
  *C04B 38/00* (2006.01)

(52) U.S. Cl.
  CPC ......... *B01D 46/2474* (2013.01); *B01D 53/94* (2013.01); *B01D 53/9459* (2013.01); *B01J 35/04* (2013.01); *C04B 38/0012* (2013.01); *F01N 3/022* (2013.01); *F01N 3/28* (2013.01); *B01D 2046/2481* (2013.01); *B01D 2046/2485* (2013.01); *B01D 2046/2488* (2013.01); *B01D 2255/1021* (2013.01); *B01D 2255/1023* (2013.01); *B01D 2255/1025* (2013.01); *B01D 2279/30* (2013.01)

(58) Field of Classification Search
  USPC .............. 55/385.3, 523, 483, 484, DIG. 30; 60/298, 311; 422/177, 180; 428/116
  See application file for complete search history.

(56) References Cited

U.S. PATENT DOCUMENTS

| | | | | |
|---|---|---|---|---|
| 5,259,190 A * | 11/1993 | Bagley | ............... | B01D 46/0032 422/174 |
| 5,266,278 A * | 11/1993 | Harada | ............... | F01N 3/2026 219/541 |
| RE35,134 E * | 12/1995 | Mizuno | ............... | B01J 35/0033 219/552 |
| 5,651,248 A * | 7/1997 | Kawamura | ........ | B01D 46/0063 55/283 |
| 5,800,787 A * | 9/1998 | Kato | ............... | B01J 35/0033 219/205 |
| 5,852,285 A * | 12/1998 | Kato | ............... | B01J 35/0033 219/553 |
| 5,861,611 A * | 1/1999 | Kato | ............... | B01J 35/0033 219/205 |
| 6,939,522 B1 * | 9/2005 | Harada | ............. | B01D 39/2075 422/211 |
| 7,056,365 B2 * | 6/2006 | Ichikawa | ........... | B01D 46/2451 428/116 |
| 7,238,217 B2 * | 7/2007 | Cutler | ............... | B01D 46/2429 55/385.3 |
| 7,384,441 B2 * | 6/2008 | Ito | ............... | B01D 39/2068 428/116 |
| 8,158,908 B2 * | 4/2012 | Konieczny | ........... | F01N 13/0097 219/202 |
| 8,257,460 B2 * | 9/2012 | Komori | ............. | B01D 46/2459 422/177 |
| 8,530,803 B2 * | 9/2013 | Sakashita | ........... | B01J 35/04 219/541 |
| 8,535,405 B2 * | 9/2013 | Noguchi | ............... | F01N 3/2026 55/523 |
| 8,597,585 B2 * | 12/2013 | Sakashita | ........... | B01J 35/04 422/174 |
| 8,716,635 B2 * | 5/2014 | Noguchi | ............... | B01J 35/04 219/553 |
| 8,907,256 B2 * | 12/2014 | Hashimoto | ............. | F01M 5/00 219/553 |
| 9,073,289 B2 * | 7/2015 | Tamai | ............... | B32B 3/12 |
| 9,533,294 B2 * | 1/2017 | Hayashi | ............... | B01J 32/00 |
| 9,586,195 B2 * | 3/2017 | Hayashi | ............... | C04B 35/195 |
| 2003/0134084 A1 * | 7/2003 | Ichikawa | ........... | C04B 38/0006 428/116 |
| 2004/0071932 A1 * | 4/2004 | Ishihara | ............... | B28B 11/007 428/116 |
| 2004/0101654 A1 * | 5/2004 | Hijikata | ............... | B32B 3/12 428/116 |
| 2004/0131512 A1 * | 7/2004 | Abe | ............... | B01J 35/04 422/180 |
| 2004/0258582 A1 * | 12/2004 | Miwa | ............... | B01D 46/2429 422/177 |
| 2005/0042151 A1 * | 2/2005 | Alward | ............... | C04B 35/624 422/177 |
| 2005/0235622 A1 | 10/2005 | Cutler et al. | | |
| 2009/0269548 A1 | 10/2009 | Mizutani | | |
| 2010/0205918 A1 | 8/2010 | Dietzhausen et al. | | |
| 2011/0132194 A1 | 6/2011 | Ahmed et al. | | |
| 2012/0076698 A1 * | 3/2012 | Ishihara | ............... | B01D 53/00 422/174 |
| 2012/0076699 A1 * | 3/2012 | Ishihara | ............... | H05B 3/42 422/174 |
| 2012/0251767 A1 | 10/2012 | Ishikawa et al. | | |
| 2012/0317942 A1 * | 12/2012 | Komori | ............... | B01D 46/247 55/483 |
| 2013/0043236 A1 * | 2/2013 | Sakashita | ........... | B01J 35/04 219/553 |
| 2014/0212339 A1 * | 7/2014 | Kaneda | ............... | C04B 35/573 422/173 |
| 2014/0298779 A1 * | 10/2014 | Miyairi | ............... | F01N 3/022 60/298 |
| 2015/0004353 A1 | 1/2015 | Hayashi et al. | | |
| 2015/0030510 A1 * | 1/2015 | Mase | ............... | F01N 3/2026 422/180 |
| 2015/0037220 A1 * | 2/2015 | Goto | ............... | F01N 3/0222 422/171 |
| 2015/0037221 A1 * | 2/2015 | Shibata | ............... | B01D 53/94 422/177 |
| 2015/0037532 A1 * | 2/2015 | Shibata | ............... | B01D 46/247 428/117 |
| 2017/0016366 A1 | 1/2017 | Suzawa et al. | | |

FOREIGN PATENT DOCUMENTS

| | | |
|---|---|---|
| JP | 2006-281134 | 10/2006 |
| JP | 2008-18370 | 1/2008 |
| JP | 2010-227923 | 10/2010 |
| JP | 2011-98335 | 5/2011 |
| JP | 2014-69183 | 4/2014 |
| JP | WO2015151823 * | 3/2015 |
| JP | 2015-175359 | 10/2015 |
| JP | 2018-38941 | 3/2018 |
| WO | 2012/046484 A1 | 4/2012 |

\* cited by examiner

EXHAUST GAS PURIFICATION FILTER

This application is the U.S. national phase of International Application No. PCT/JP2016/056918 filed Mar. 7, 2016 which designated the U.S. and claims priority to JP Patent Application No. 2015-066567 filed Mar. 27, 2015 and JP Patent Application No. 2016-015584 filed Jan. 29, 2016, the entire contents of each of which are hereby incorporated by reference.

TECHNICAL FIELD

The present invention relates to exhaust gas purification filters capable of purifying exhaust gas emitted from internal combustion engines.

BACKGROUND ART

An exhaust gas purification device is mounted on an exhaust gas pipe connected to an internal combustion engine so as to trap and collect particulate matter (PM) contained in exhaust gas emitted from the internal combustion engine. The exhaust gas purification device is equipped with an exhaust gas purification filter to trap and collect particulate matter contained in exhaust gas. The exhaust gas purification filter is composed of a plurality of cell walls and a plurality of cell holes. Each of the cell holes is a channel surrounded by the cell walls, through which exhaust gas passes. In the exhaust gas purification filter having the structure previously described, each of first cell holes as gas flow channels is plugged on a first end surface of the exhaust gas purification filter by a plug member, and each of the first cell holes on a second end surface of the exhaust gas purification filter is open to form an opening part. Further, each of second cell holes as gas flow channels on the first end surface of the exhaust gas purification filter is open to form an opening part, and each of the second cell holes is plugged on the second end surface of the exhaust gas purification filter by a plug member. The exhaust gas is introduced to the inside of the exhaust gas purification filter through the opening part of each of the second cell holes formed on the first end surface of the exhaust gas purification filter, and passes through the cell walls formed between the first cell hole and the second cell hole, and is then discharged to the outside of the exhaust gas purification filter through the opening part of the first cell holes on the second end surface of the exhaust gas purification filter. This structure of the exhaust gas purification device allows exhaust gas to enter into the second cell holes having the opening part formed at the upstream side of the exhaust gas, and to allow the exhaust gas to pass through the cell walls arranged between the first cell holes and the second cell holes, and to allow the exhaust gas to enter into the first cell holes, and finally to be discharged to the outside through the opening part of each of the first cell holes formed at the downstream side of the exhaust gas on the second end surface of the exhaust gas purification filter.

The exhaust gas purification filter having the structure previously described has a drawback of increased pressure loss. In addition, there is another problem in which exhaust gas with ash produced from a very small amount of impurity elements contained in engine oil and fuel are supplied to the exhaust gas purification filter, and ash is accumulated in the cells of the exhaust gas purification filter. An accumulation of ash causes the phenomenon of increasing the pressure loss of the exhaust gas purification filter. In order to avoid such a conventional problem, patent document 1, discloses an exhaust gas purification filter having a structure in which plug members are arranged only on the end surface of the exhaust gas purification filter at the upstream-side of exhaust gas.

CITATION LIST

[Patent document 1] PCT International publication No. 2012/046484.

SUMMARY OF INVENTION

Technical Problem

However, when exhaust gas passes at high speed through the exhaust gas purification filter having a structure in which plug members are arranged only on one end surface of the exhaust gas purification filter at the upstream side of exhaust gas, because some amount of exhaust gas passes through the exhaust gas purification filter without penetrating and passing through the cell walls, it is necessary to avoid this phenomenon. In order to solve the conventional problem, the conventional technique takes a countermeasure to increase a total length of a base member (or a honeycomb structure body) of the exhaust gas purification filter, or a countermeasure to combine two base members, i.e. arrange not less than two exhaust gas purification filters in series. Those conventional countermeasures make it possible to suppress the collection rate of particulate matter contained in exhaust gas from reducing, but to introduce another problem of increasing an overall size of the exhaust gas purification filter.

As previously described, it is generally difficult to solve both the conventional problems simultaneously so as to reduce the pressure loss and to increase the collection rate of particulate matter in such an exhaust gas purification filter having a uniform cell-shape structure. The same problems will occur in the following two types of conventional cell structures. In one cell structure, some of cells at the upstream side only are plugged by plug members. In another cell structure, some of cells at the upstream side are plugged by plug members and the remaining cells at the downstream side are plugged by plug members.

The present invention has been made in consideration of the foregoing circumstances, and it is an object of the present invention to provide an exhaust gas purification filter having a small size and capable of increasing a collection rate of collecting particulate matter, contained in exhaust gas and ash component emitted from an internal combustion engine, and capable of reducing a pressure loss of the exhaust gas purification filter.

Solution to Problem

In accordance with an aspect of the present invention, there is provided an exhaust gas purification filter (1) for trapping and collecting particulate matter contained in exhaust gas. The exhaust gas purification filter (1) has a honeycomb structure body (2) and upstream side plug members (3). The upstream side plug members (3) are arranged at an axial direction (Z) of the honeycomb structure body (2). Some of a plurality of cell holes (5) as gas flow channels on an upstream side end surface (21) of the honeycomb structure body are plugged by the upstream side plug members (3). The honeycomb structure body (2) has a plurality of cell walls (4) and the plurality of cell holes (5). The plurality of cell holes (5) are surrounded by the plurality of cell walls (4). The plurality of cell holes (5) have inlet cell holes (51) and outlet cell holes (52). The inlet cell holes (51) on the upstream side end surface (21) of the honeycomb structure body are open. The outlet cell holes (52) on the upstream side end surface (21) of the honeycomb structure body are plugged by the upstream side plug members (3). The outlet cell holes (52) on a downstream side end surface (22) of the honeycomb structure body are open. The honeycomb structure body (2) has a central area (23) and an outer peripheral area (24). The central area (23) includes a central axis of the honeycomb structure body (2). The outer peripheral area (24) is arranged at the outer peripheral side of the central area (23). In each of the central area (23) and the outer peripheral area (24), a gas flow channel cross sectional area (Sc2, So2) of the outlet cell holes (52) is larger than a gas flow channel cross sectional area (Sc1, So1) of the inlet cell holes (51). The gas flow channel cross sectional area (Sc1) of the inlet cell holes (51) in the central area (23) is smaller than the gas flow channel cross sectional area (So1) of the inlet cell holes (51) in the outer peripheral area (24). A first ratio Rc in the central area (23) is smaller than a second ratio Ro in the outer peripheral area (24). The first ratio Rc is a ratio of the gas flow channel cross sectional area (Sc1) of the inlet cell holes (51) to the gas flow channel cross sectional area (Sc2) of the outlet cell holes (52) in the central area (23). The second ratio Ro is a ratio of the gas flow channel cross sectional area (So1) of the inlet cell holes (51) to the gas flow channel cross sectional area (So2) of the outlet cell holes (52) in the outer peripheral area (24). When viewed along the axial direction (Z) of the honeycomb structure body (2), the plurality of cell holes (5) are arranged with a first direction (X) and a second direction (Y), which are perpendicular with each other, in the central area (23) and the outer peripheral area (24). The inlet cell holes (51) and the outlet cell holes (52) are alternately arranged in the first direction (X) and the second direction (Y). A thickness of the plurality of cell walls (4) in the central area (23) is thicker than a thickness of the plurality of cell walls (4) in the outer peripheral area (24).

Advantageous Effects of Invention

The exhaust gas purification filter according to the present invention has the inlet cell holes and the outlet cell holes. Exhaust gas is introduced from the upstream side of the exhaust gas purification filter into the inside of the inlet cell holes. A some amount of exhaust gas introduced in the inlet cell holes passes through the cell walls formed between the inlet cell holes and the outlet cell holes, and enters to the inside of the outlet cell holes due to a pressure difference between a pressure of the inside of the inlet cell holes and a pressure of the inside of the outlet cell holes. When the exhaust gas passes through the cell walls, particulate matter contained in the exhaust gas is trapped and collected by the cell walls.

In general, there is a tendency in which a flow speed of exhaust gas near the central axis on the upstream side end surface of the honeycomb structure body becomes high when the exhaust gas is introduced into the honeycomb structure body from the upstream side end surface of the exhaust gas purification filter arranged to an exhaust gas passage. For this reason, a pressure loss in the cell holes formed at the outer peripheral side of the central axis on the upstream side end surface of the honeycomb structure body becomes large, and reduces a collection rate of collecting particulate matter. On the other hand, it is hard to increase a pressure loss in the cell holes arranged far from the central axis of the honeycomb structure body because a flow speed of exhaust gas is relatively low.

The exhaust gas purification filter according to the present invention has an improved structure in which a gas flow channel cross sectional area of the inlet cell holes in the central area at the upstream side end surface of the honeycomb structure body is smaller than a gas flow channel cross sectional area of the inlet cell holes in the outer peripheral area at the upstream side end surface of the honeycomb structure body. When compared with a structure of cell holes having a uniform gas flow channel cross sectional area in an exhaust gas purification filter, it is possible to promote the flow of exhaust gas into the outer peripheral area. This structure of the honeycomb structure body according to the present invention makes it possible to suppress a pressure loss in the central area from increasing, and to provide an effect of increasing the collection rate of particulate matter (PM).

Further, because this structure makes it possible to provide an adequate amount of exhaust gas into the outer peripheral area of the exhaust gas purification filter, it is possible to use the cell walls in the outer peripheral area with high efficiency, and to increase an overall filtering area capable of purifying exhaust gas in the exhaust gas purification filter. As a result, this improved structure makes it possible to reduce an overall size of the honeycomb structure body while keeping the adequate collection rate.

Still further, because the first ratio in the central area is smaller than the second ratio in the outer peripheral area, it is possible to suppress variation of flow speed of exhaust gas in the central area and the outer peripheral area with high efficiency. This structure makes it possible to reduce the overall size of the exhaust gas purification filter while discharging exhaust gas flow to outside of the exhaust gas purification filter without passing through the cell walls.

Still further, when viewed along the axial direction Z of the honeycomb structure body, the plurality of cell holes are arranged in the first direction X and the second direction Y, which are perpendicular with each other, in the central area and the outer peripheral area. The inlet cell holes and the outlet cell holes are alternately arranged in the first direction X and the second direction Y. Furthermore, a thickness of the plurality of cell walls in the central area is thicker than a thickness of the plurality of cell walls in the outer peripheral area. This improved structure of the honeycomb structure body makes it possible to prevent a large variation of the cell-hole arrangement from being generated in the central area and the outer peripheral area in the honeycomb structure body. This improved structure makes it possible to avoid the formation of boundary cell walls at a boundary part between the central area and the outer peripheral area in addition to form the cell walls. As a result, it is possible to easily form the exhaust gas purification filter with low manufacturing cost. Furthermore, this structure makes it possible to suppress concentration of stress toward the boundary part between the central area and the outer peripheral area, and to provide the exhaust gas purification filter having superior durability.

As previously described, the present invention makes it possible to provide the exhaust gas purification filter with a reduced size while increasing the collecting ratio of particulate matter. The reference number and characters in brackets described in the section Claims and the section "Solution to Problem" show the correspondence relationship to concrete components and means used in the embodiments, which will be described. However, this correspondence relationship does not limit the scope of the present invention.

DESCRIPTION OF EMBODIMENTS

It is acceptable for the exhaust gas purification filter according to the present invention to have a structure in which some of the downstream side end surface of the honeycomb structure body are plugged by using the downstream side plug members. It is acceptable for the exhaust gas purification filter according to the present invention to have a structure in which the downstream side end surfaces of the inlet cell holes are plugged by using the downstream side plug members. That is, the upstream side end surfaces of the inlet cell holes are open, and the downstream side end surfaces of the inlet cell holes are plugged by using the downstream side plug members. It is also acceptable for the exhaust gas purification filter according to the present invention to have a structure in which both the upstream side end surfaces and the downstream side end surfaces of the inlet cell holes are open.

First Exemplary Embodiment

Figure 1:
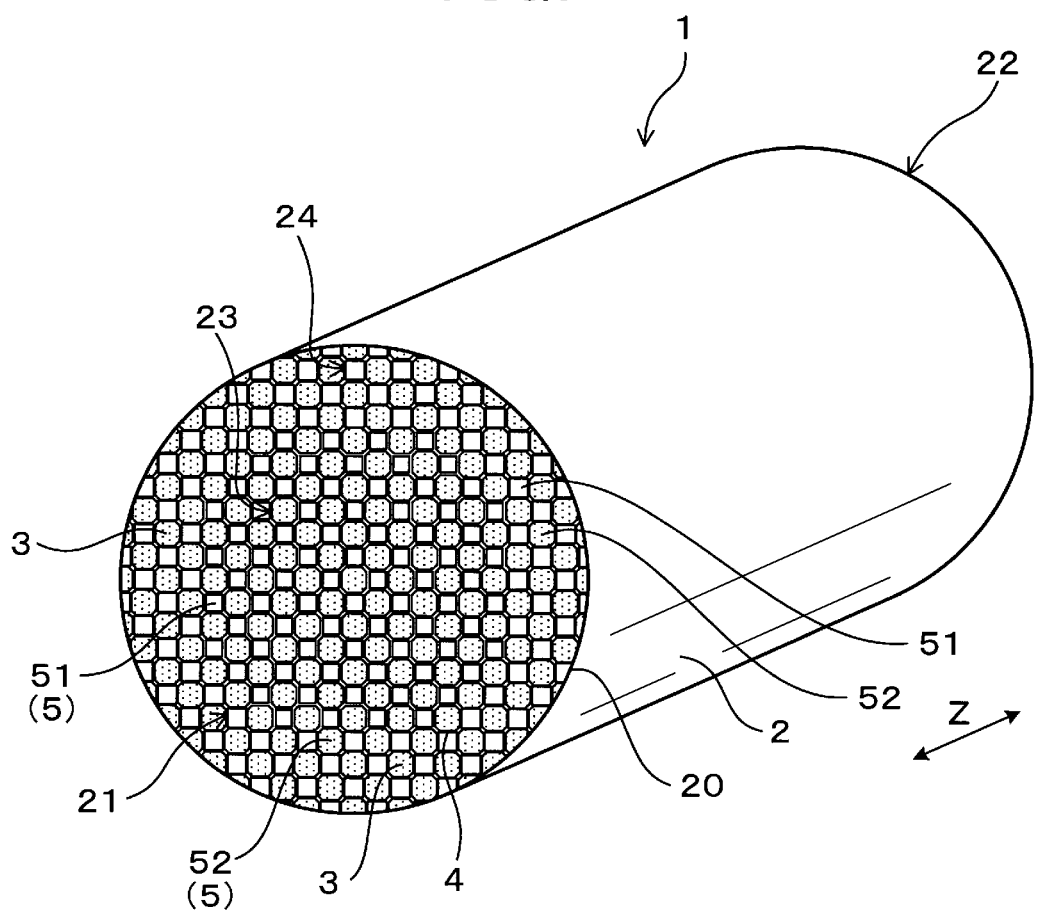
FIG. 1 is a perspective view showing an exhaust gas purification filter according to the first exemplary embodiment of the present invention.

A description will be given of the exhaust gas purification filter according to the first exemplary embodiment with reference to FIG. 1 to FIG. 6. The exhaust gas purification filter 1 according to the first exemplary embodiment is capable of trapping and collecting particulate matter contained in exhaust gas. As shown in FIG. 1, the exhaust gas purification filter 1 has a honeycomb structure body 2, and upstream side plug members 3 with which some parts on the upstream side end surface 21 of the honeycomb structure body 2 are partially plugged.

As shown in FIG. 2 to FIG. 6, the honeycomb structure body 2 has a plurality of cell walls 4 and a plurality of cell holes 5. Each of the plurality of cell holes 5 is surrounded by the cell walls 4. The plurality of cell holes 5 have inlet cell holes 51 and outlet cell holes 52. Each of the inlet cell holes 51 on an upstream side end surface 21 of the honeycomb structure body 2 is open. Each of the outlet cell holes 52 on a downstream side end surface 22 of the honeycomb structure body 2 is open.

The exhaust gas purification filter 1 according to the first exemplary embodiment has a one end-surface plugged structure in which some parts on the upstream side end surface 21 of the honeycomb structure body 2 are plugged by the upstream side plug member 3. For this reason, in the structure of the exhaust gas purification filter 1 according to the first exemplary embodiment, all of the open cell holes are formed as through holes along the axial direction Z of the honeycomb structure body 2, and all of the outlet cell holes 52 are plugged by the upstream side plug members on the upstream side end surface 21 of the honeycomb structure body 2.

Figure 3:
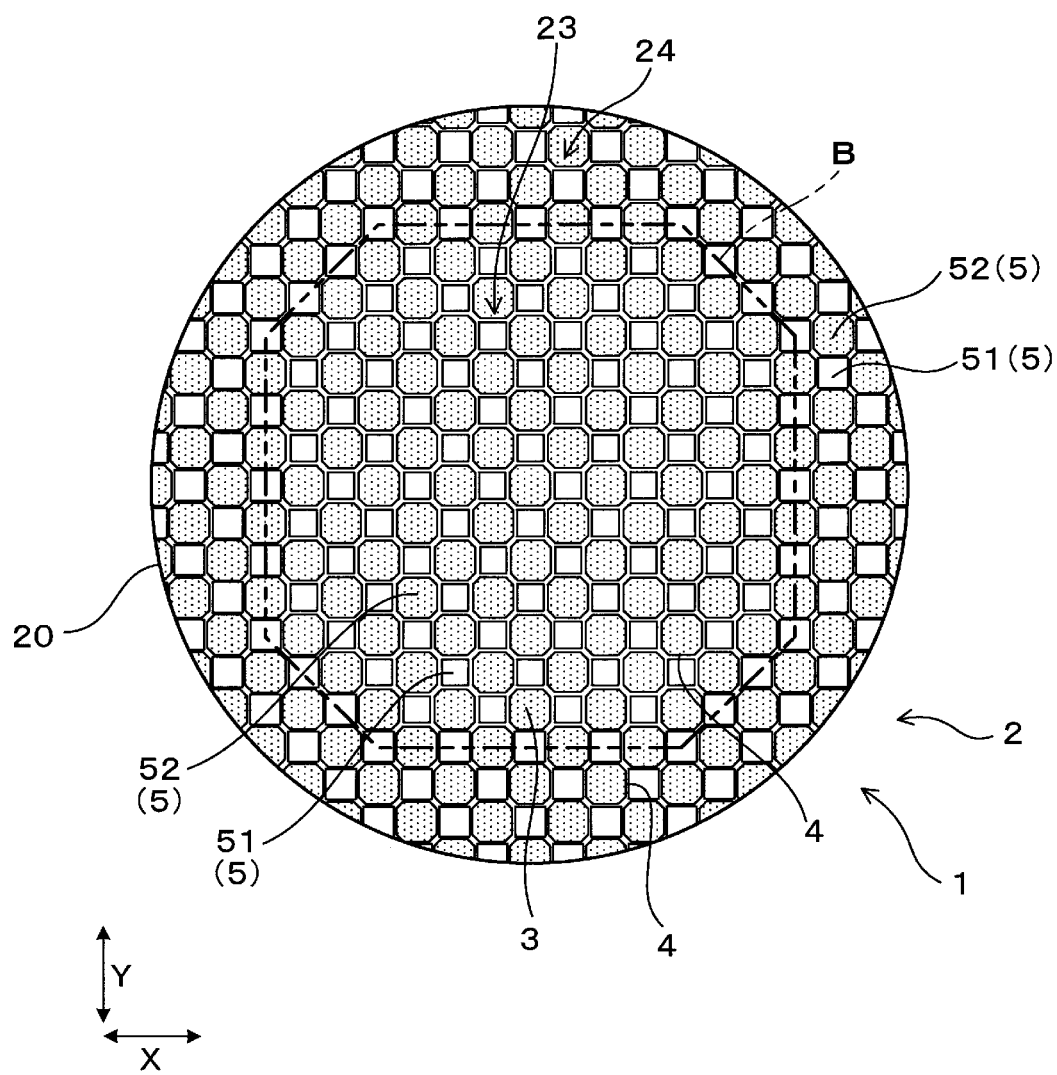
FIG. 3 is a plan view showing the exhaust gas purification filter according to the first exemplary embodiment of the present invention, viewed from the axial direction of the exhaust gas purification filter.
Figure 4:
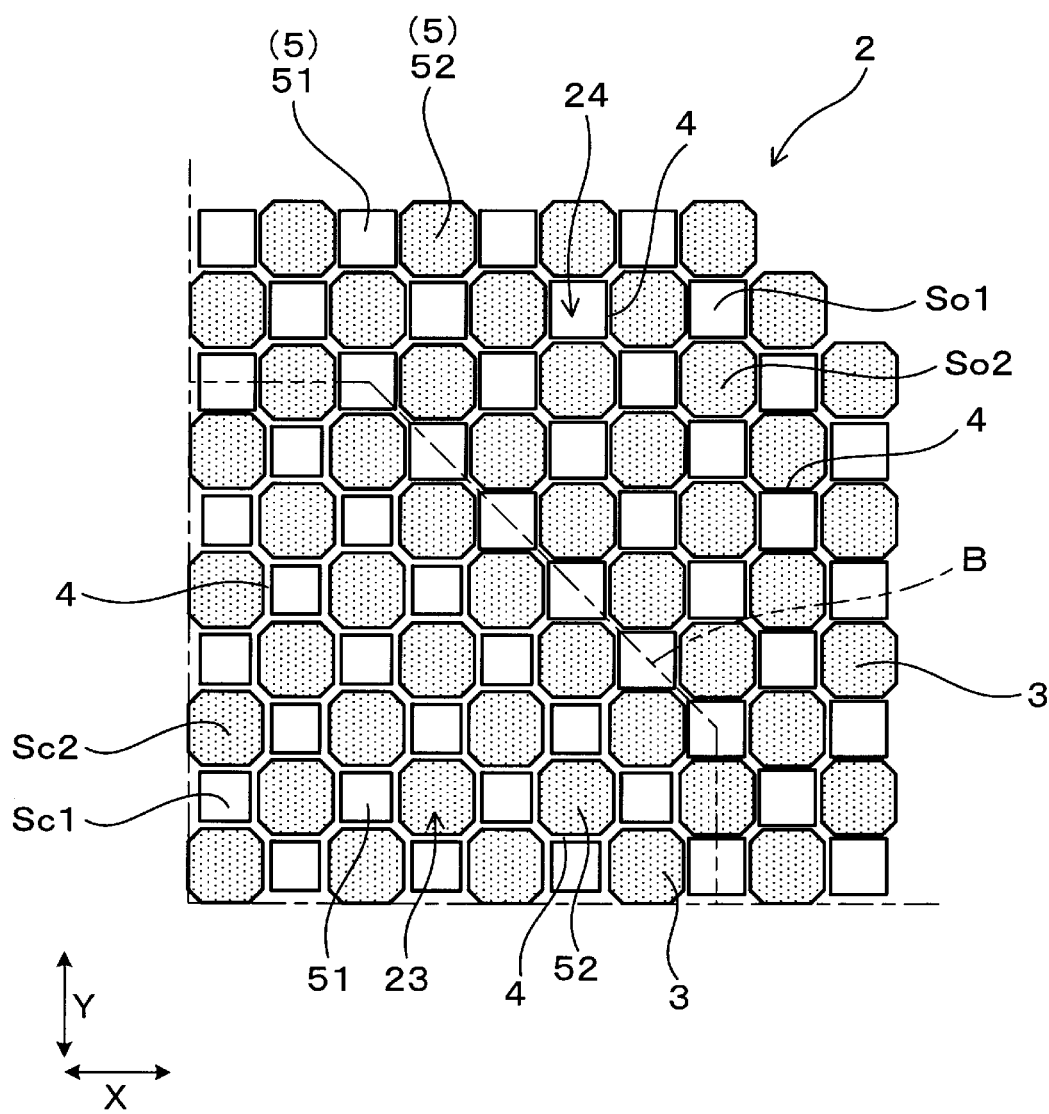
FIG. 4 is a view explaining an arrangement of inlet cell holes and outlet cell holes in the exhaust gas purification filter according to the first exemplary embodiment of the present invention.
Figure 5:
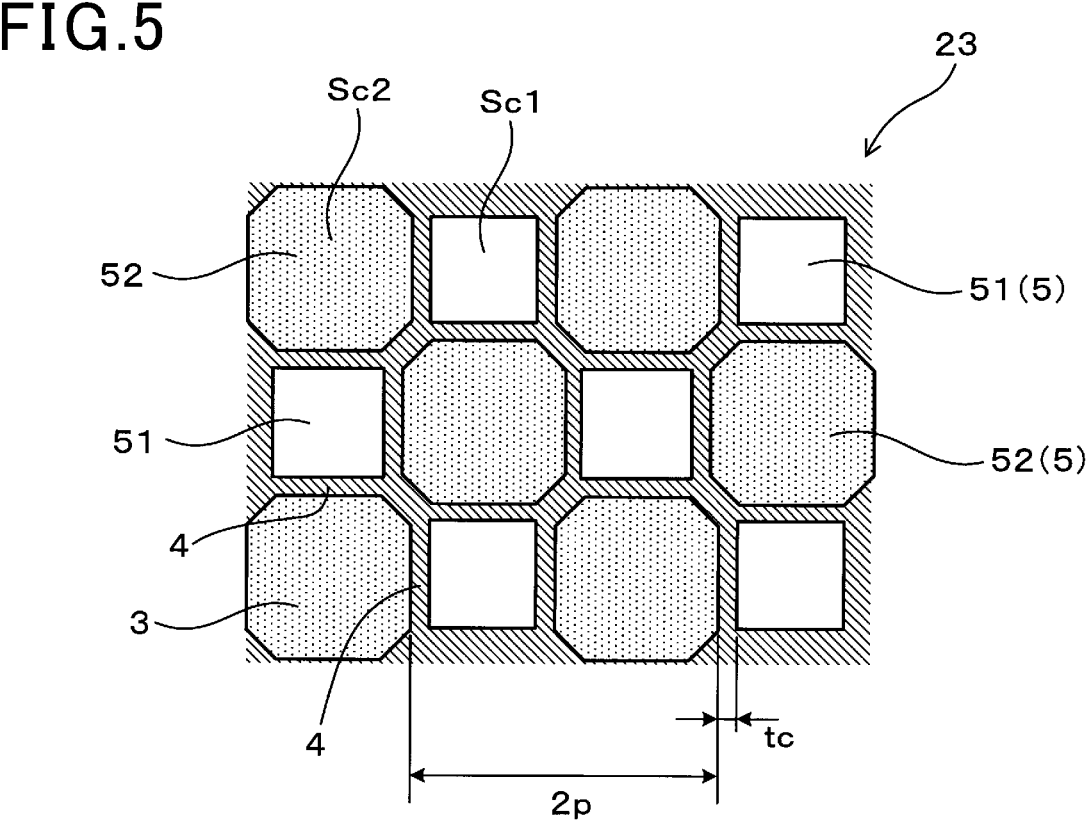
FIG. 5 is a view explaining an arrangement of the inlet cell holes and the outlet cell holes in the central area of the exhaust gas purification filter according to the first exemplary embodiment of the present invention.
Figure 6:
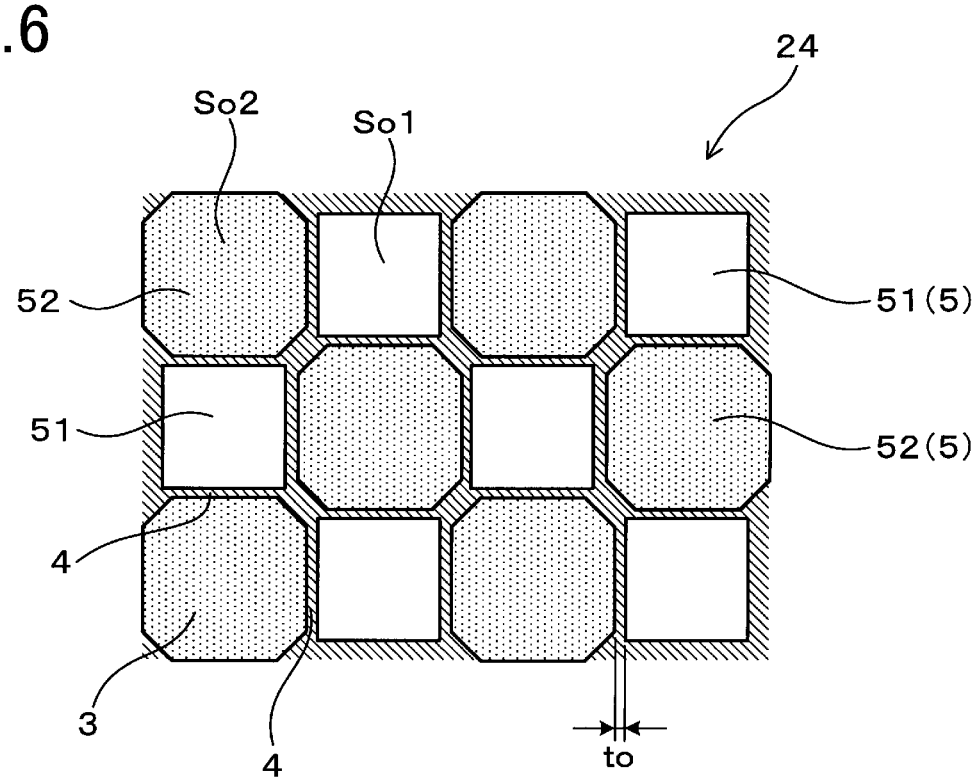
FIG. 6 is a view explaining an arrangement of the inlet cell holes and the outlet cell holes in the outer peripheral area of the exhaust gas purification filter according to the first exemplary embodiment of the present invention.

As shown in FIG. 3 and FIG. 4, the honeycomb structure body 2 has a central area 23 and an outer peripheral area 24. The central area 23 contains the central axis of the honeycomb structure body 2. The outer peripheral area 24 is arranged at the outer peripheral side of the central area 23. As shown in FIG. 4 to FIG. 6, in each of the central area 23 and the outer peripheral area 24, the exhaust gas purification filter 1 according to the first exemplary embodiment has the structure in which in each of the central area 23 and the outer peripheral area 24, a gas flow channel cross sectional area $Sc2$ ($mm^2$), $So2$ ($mm^2$) of the outlet cell holes 52 is larger than a gas flow channel cross sectional area $Sc1$ ($mm^2$), $So1$ ($mm^2$) of the inlet cell holes 51. That is, this structure satisfies a relationship of $Sc1<Sc2$ and $So1<So2$. Further, the gas flow channel cross sectional area $Sc1$ of the inlet cell holes 51 in the central area 23 is smaller than the gas flow channel cross sectional area So1 of the inlet cell holes 51 in the outer peripheral area 24. Those gas flow channel cross sectional area Sc1, Sc2, So1 and So2 correspond to a gas flow channel cross sectional area (mm$^2$) of each of cell holes 5.

It is possible to apply the exhaust gas purification filter 1 according to the first exemplary embodiment to internal combustion engines for various types of vehicles, for example, so as to purify exhaust gas generated in and emitted from diesel engines and gasoline engines. As shown in FIG. 1, the exhaust gas purification filter 1 has a cylindrical shape. The inside of the honeycomb structure body 2 which forms the exhaust gas purification filter 1 are partitioned by a plurality of cell walls 4 formed along the axial direction Z of the exhaust gas purification filter 1. The cell walls 4 are made of ceramic material such as cordierite having a porous structure. Pores (not shown) are formed in the cell walls 4 arranged between adjacent cell holes 5, through which exhaust gas passes.

Figure 2:
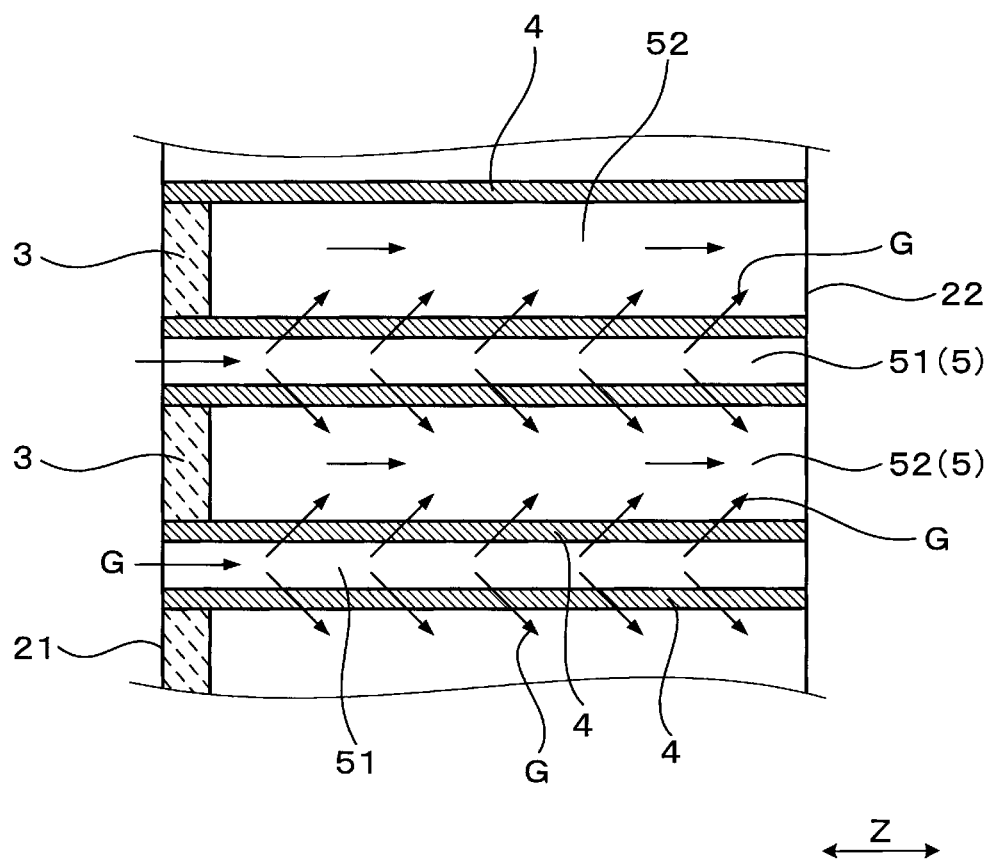
FIG. 2 is a view showing a cross section parallel to an axial direction of the exhaust gas purification filter according to the first exemplary embodiment of the present invention.

As shown in FIG. 1 and FIG. 2, the upstream side plug members 3 are formed at some parts on the upstream side end surface 21 of the honeycomb structure body 2. The upstream side end surface 21 faces the upstream side of exhaust gas flow when the exhaust gas purification filter 1 is mounted on an exhaust gas system of an internal combustion engine. That is, the outlet cell holes 52 are plugged by the upstream side plug members 3 on the upstream side end surface 21 of the honeycomb structure body 2.

On the other hand, no upstream side plug member 3 is formed on the downstream side end surface 22 of the honeycomb structure body 2, i.e. the outlet cell holes 52 at the downstream side of the honeycomb structure body 2 are open. The inlet cell holes 51 at the upstream side and the downstream side of the honeycomb structure body 2 penetrate, i.e. are open in the axial direction Z of the honeycomb structure body 2. As shown in FIG. 3, the cell holes which face with, i.e. are in contact with an outer peripheral section 20 of the honeycomb structure body 2 have a shape and a gas flow channel cross sectional area which are different from those of the inlet cells and the outlet cells. In the following explanation, the inlet cell holes 51 and the outlet cell holes 52 are different from the cell holes which face with, i.e. are in contact with the outer peripheral section 20. In other words, the inlet cell holes 51 and the outlet cell holes 52 are not in contact with the outer peripheral section 20.

As shown in FIG. 3 to FIG. 6, when viewed along the axial direction Z of the honeycomb structure body 2, the outlet cell holes 52 have an octagonal shape, and the inlet cell holes 51 have a rectangular shape. In particular, in the honeycomb structure body 2 according to the first exemplary embodiment, the inlet cell holes 51 have a square shape, and the outlet cell holes 52 have an octagonal shape with a 4-fold rotational symmetry. An each corner of each of the cell holes 5 in a concrete honeycomb structure body 2 has a curved shape or a tapered shape. In the following explanation, such a rectangular shape of each inlet cell hole and such an octagonal shape of each outlet cell hole previously described have curved corners or tapered corners. Accordingly, such a rectangular shape (or a square shape) and an octagonal shape of each of the ell holes 5 are schematic shapes of each of the cell holes 5.

Figure 7:
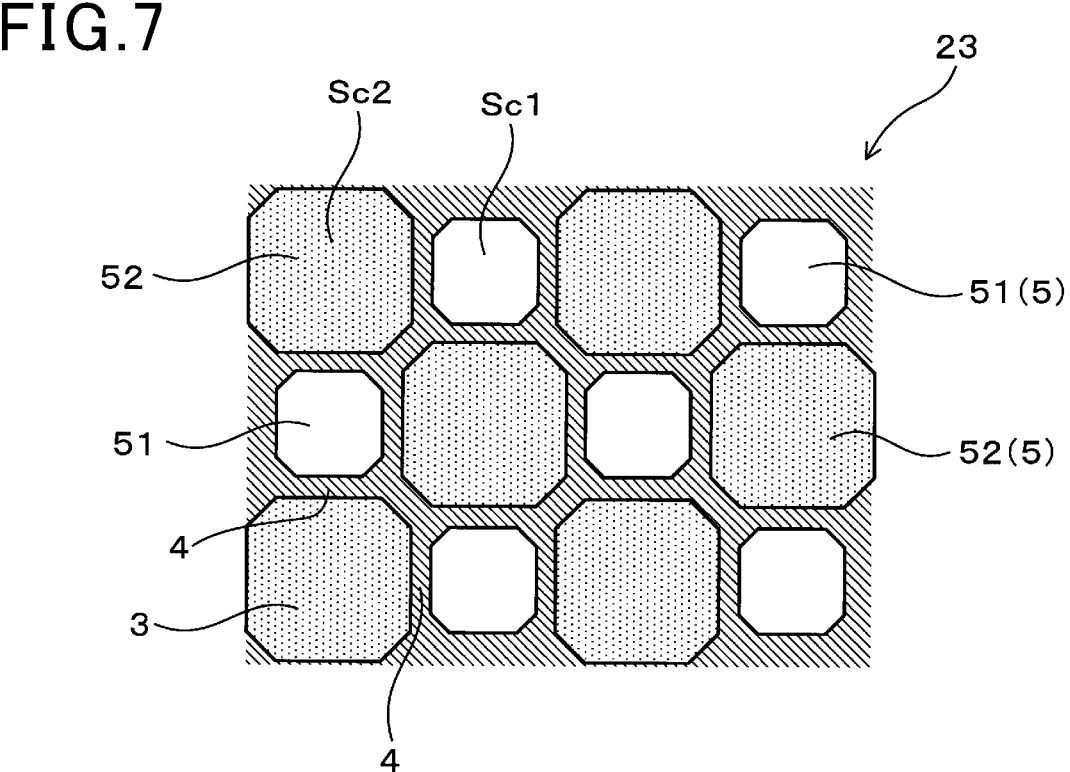
FIG. 7 is a view explaining an arrangement of the inlet cell holes having an octagonal shape and the outlet cell holes having an octagonal shape of the exhaust gas purification filter according to a modification of the first exemplary embodiment of the present invention.
Figure 8:
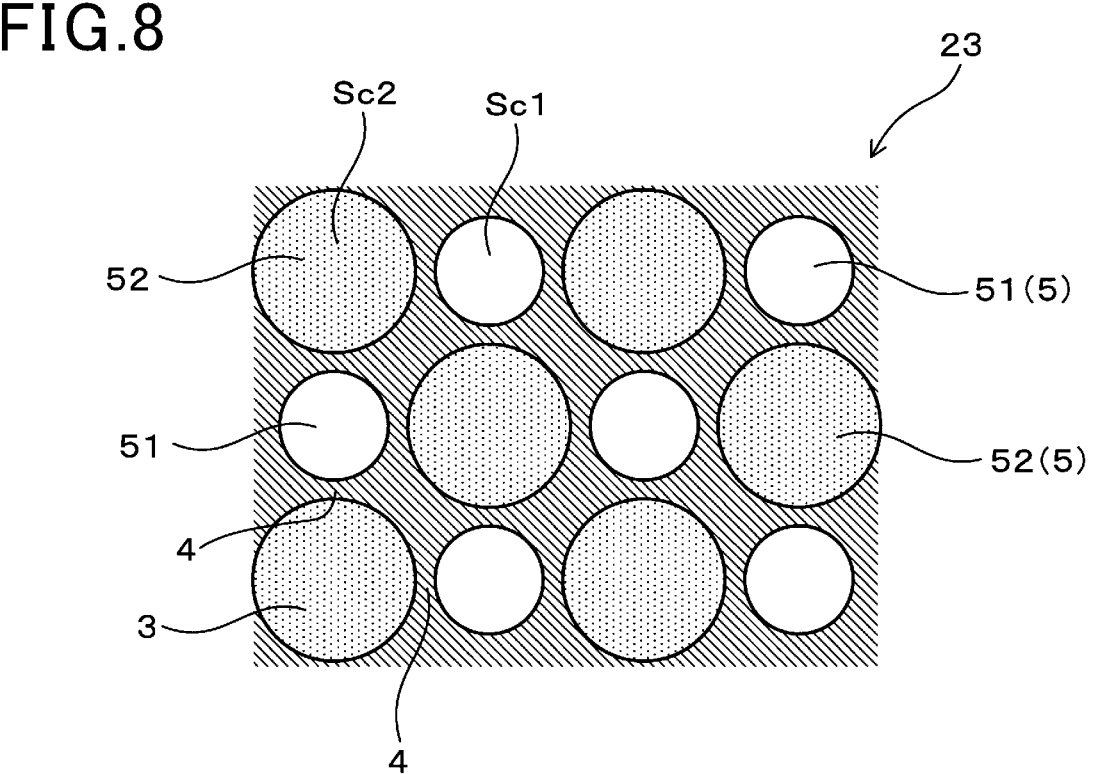
FIG. 8 is a view explaining an arrangement of the inlet cell holes having a circular shape and the outlet cell holes having a circular shape of the exhaust gas purification filter according to a comparative example.

The concept of the present invention is not limited by the shape combination of the inlet cell holes 51 and the outlet cell holes 52 having a rectangular shape and an octagonal shape previously described. For example, as shown in FIG. 7, it is acceptable for both the inlet cell holes 51 and the outlet cell holes 52 to have an octagonal shape. Further, as shown in FIG. 8, it is also acceptable for both the inlet cell holes 51 and the outlet cell holes 52 to have a circular shape.

Figure 9:
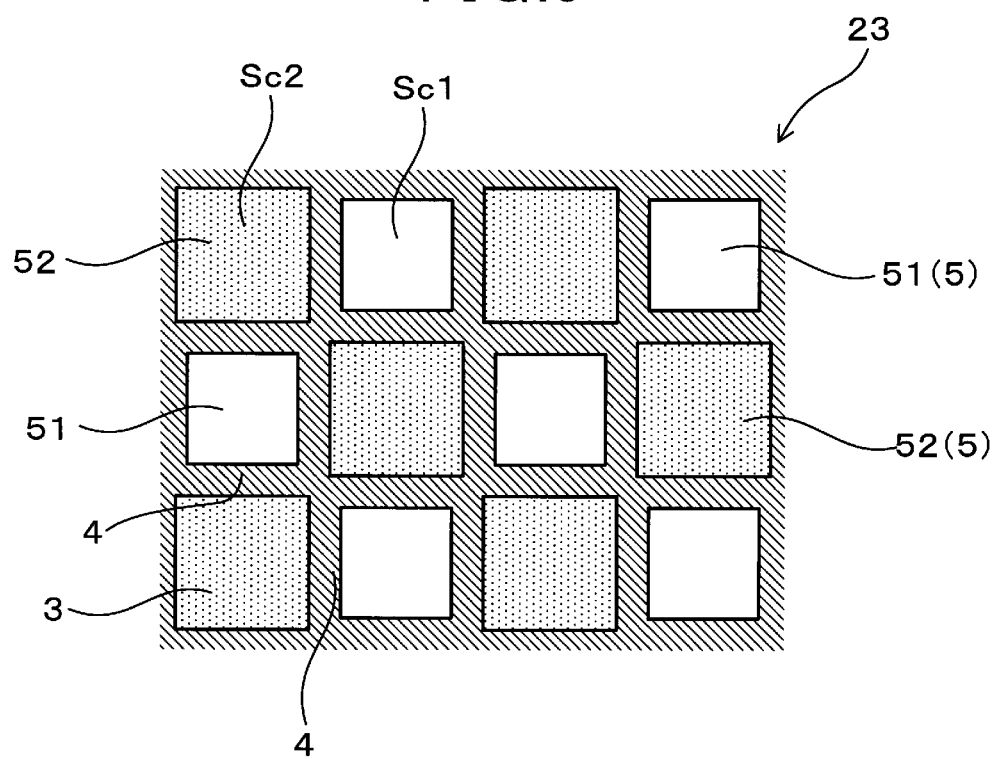
FIG. 9 is a view explaining an arrangement of the inlet cell holes having a rectangular shape and the outlet cell holes having a rectangular shape of the exhaust gas purification filter according to another comparative example.

A comparative example shown in FIG. 9 has the inlet cell holes 51 and the outlet cell holes 52. Each of the inlet cell holes 51 and the outlet cell holes 52 has a square shape. However, this structure of the inlet cell holes 51 and the outlet cell holes 52 provides a thin cell wall 4 arranged toward a diagonal line of each of the output cell holes 52. This structure reduces a strength of the honeycomb structure body because of having such thin cell walls 4. On the other hand, when a thickness of the cell walls 4 formed toward the diagonal line of each of the outlet cell holes 52 increases in the structure in which the inlet cell holes 51 and the outlet cell holes 52 having a square shape, it is necessary to also increase a thickness of the other cell walls. This increases the overall pressure loss of the honeycomb structure body. For this reason, it is preferable for the inlet cell holes 51 and the outlet cell holes 52 to have a combination of a rectangular shape and an octagonal shape as shown in FIG. 5 and FIG. 6. It is also preferable for the inlet cell holes 51 and the outlet cell holes 52 to have an octagonal shape only as shown in FIG. 7. From the point of view of maintaining a filter area exhaust gas, it is preferable for the inlet cell holes 51 and the outlet cell holes 52 to have a combination of a square shape and an octagonal shape shown in FIG. 5 and FIG. 6 or to have an octagonal shape only shown in FIG. 7 rather than to have a circular shape.

As shown in FIG. 3 and FIG. 4, when the honeycomb structure body 2 is viewed along the axial direction Z, the plurality of cell holes 5 in the central area 23 and the outer peripheral area 24 are alined in two direction, i.e. the first direction X and the second direction Y which intersect and are perpendicular from each other. The inlet cell holes 51 and the outlet cell holes 52 are alternately arranged in the first direction X and the second direction Y. A thickness of the cell wall 4 in the central area 23 is thicker than a thickness of the cell wall 4 in the outer peripheral area 24.

In the exhaust gas purification filter according to the first exemplary embodiment, the first direction X is perpendicular to the second direction Y. The inlet cell holes 51 and the outlet cell holes 52 are arranged with a checkered pattern. This checkered pattern are continuously formed in the overall area of the honeycomb structure body 2, where the overall area contains the central area 23 and the outer peripheral area 24.

The honeycomb structure body 2 has the central area 23 and the outer peripheral area 24 which have a constant cell pitch. That is, in the first direction X and the second direction Y, the cell pitch as an arrangement pitch of the cell holes 5 has a constant value in the central area 23 and the outer peripheral area 24. Accordingly, the gas flow channel cross sectional area Sc1 and the gas flow channel cross sectional area Sc2 of the inlet cell holes 51 in the central area 23 and the outer peripheral area 24 is changed due to variation of a thickness of each cell wall 4.

Specifically, it is preferable for the cell holes 5 to have a cell pitch within a range of 1.14 mm to 2.54 mm in both the central area 23 and the outer peripheral area 24. This structure makes it possible to suppress the pressure loss of the honeycomb structure body 2 from increasing. On the other hand, it is possible to maintain the strength of the honeycomb structure body 2 when the cell holes 5 to have a cell pitch of not more than 2.54 mm. It is further possible to maintain the strength of the honeycomb structure body 2 when the cell holes 5 to have a cell pitch within a range of 1.27 to 1.80 mm, for example. Still further, it is possible to change the cell pitch of the cell holes 5 due to a collection ratio (%) in addition to the pressure loss (kPa) and the strength of the honeycomb structure body 2 because the cell pitch affects the collection rate (%).

A first ratio Rc (=Sc1/Sc2) in the central area 23 is smaller than a second ratio Ro (=So1/So2) in the outer peripheral area 24, where the first ratio Rc is a ratio of a gas flow channel cross sectional area Sc1 of the inlet cell holes 51 to a gas flow channel cross sectional area Sc2 of the outlet cell holes 52 in the central area 23, and the second ratio Ro is a ratio of a gas flow channel cross sectional area So1 of the inlet cell holes 51 to a gas flow channel cross sectional area So2 of the outlet cell holes 52 in the outer peripheral area 24.

It is preferable for the first ratio Rc as the gas flow channel cross sectional area ratio to be within a range of 0.36 to 0.71 in the central area 23. When Rc<=0.71, it is possible for the central area 23 to have a necessary collection ratio, where there is a tendency that exhaust gas flows at high speed in the central area 23. When Rc>=0.36, it is possible to suppress the pressure loss of the honeycomb structure body 2 from increasing. It is more preferable for the first ratio Rc to be within a range of 0.4 to 0.59 in the central area 23.

It is preferable for the second ratio Ro as the gas flow channel cross sectional area ratio to be within a range of 0.4 to 0.91 in the outer peripheral area 24. When Ro<=0.91, it is possible for the outer peripheral area 24 to have a necessary collection ratio while keeping a pressure difference between the inlet cell holes and the outlet cell holes. When Ro>=0.4, it is possible to suppress the pressure loss of the honeycomb structure body 2 from increasing. It is more preferable for the second ratio Ro to be within a range of 0.5 to 0.91 in the outer peripheral area 24.

The gas flow channel cross sectional area Sc1 of the inlet cell holes 51 in the central area 23 is smaller than the gas flow channel cross sectional area So1 of the inlet cell holes 51 in the outer peripheral area 24. On the other hand, the central area 23 and the outer peripheral area 24 have the same gas flow channel cross sectional area Sc2, So2 of the outlet cell holes 52. That is, the honeycomb structure body 2 according to the first exemplary embodiment satisfies a relationship of Sc2=So2. The cell holes 5 are arranged in the honeycomb structure body 2 so as to satisfy the relationship of Rc<Ro. As shown in FIG. 5 and FIG. 6, a thickness tc of the cell wall 4 in the central area 23 is thicker than a thickness to of the cell wall 4 in the outer peripheral area 24.

It is preferable for the cell wall 4 in the central area 23 to have the thickness tc within a range of 0.15 to 0.35 mm. When tc>=0.15 mm, it is possible to suppress particulate matter from penetrating the cell wall 4 and to increase the collection rate. When tc<=0.35 mm, it is possible to suppress the pressure loss of the honeycomb structure body 2 from increasing. Further, it is more preferable for the cell wall 4 in the central area 23 to have the thickness tc within a range of 0.18 to 0.28 mm.

It is preferable for the cell wall 4 in the outer peripheral area 24 to have the thickness to within a range of 0.10 to 0.30 mm. When to>=0.10 mm, it is possible to increase the strength of the cell wall 4. When to<=0.30 mm, it is possible to suppress the pressure loss of the honeycomb structure body 2 from increasing. Further, it is more preferable for the cell wall 4 in the outer peripheral area 24 to have the thickness to within a range of 0.13 to 0.25 mm.

It is possible to calculate a preferable range of each of the gas flow channel cross sectional area Sc1 and the gas flow channel cross sectional area Sc2 of each of the cell holes 5 in the central area 23 on the basis of the thickness of the cell wall 4, the first ratio Rc as the gas flow channel cross sectional area ratio, and the cell pitch. For example, it is preferable to have a relationship of 0.35 mm$^2$<=Sc1<=4.79 mm$^2$ and 0.72 mm$^2$<=Sc2<=8.23 mm$^2$. Further, it is preferable to have a relationship of 0.59 mm$^2$<=Sc1<=1.98 mm$^2$ and 1.22 mm$^2$<=Sc2<=3.67 mm$^2$.

Similarly, it is possible to calculate a preferable range of each of the gas flow channel cross sectional area So1 and the gas flow channel cross sectional area So2 of each of the cell holes 5 in the outer peripheral area 24 on the basis of the thickness of the cell wall 4, the first ratio Rc as the gas flow channel cross sectional area ratio, and the cell pitch. For example, it is preferable to have a relationship of 0.42 mm$^2$<=So1<=5.67 mm$^2$ and 0.72 mm$^2$<=So2<=8.23 mm$^2$. Further, it is preferable to have a relationship of 0.71 mm$^2$<=So1<=2.66 mm$^2$ and 1.22 mm$^2$<=So2<=3.67 mm$^2$.

In the exhaust gas purification filter 1 according to the first exemplary embodiment, the outlet cell holes 52 in the central area 23 and the outlet cell holes 52 in the outer peripheral area 24 have the same shape and the same size. For this reason, as shown in FIG. 3 and FIG. 4, the exhaust gas purification filter 1 according to the first exemplary embodiment has an improved structure in which the size (the gas flow channel cross sectional area) of the inlet cell holes 51 in the central area 23 is different from the size (the gas flow channel cross sectional area) of the inlet cell holes 51 in the outer peripheral area 24.

As shown in FIG. 3, when viewed along the axial direction Z of the honeycomb structure body 2, a boundary line B between the central area 23 and the outer peripheral area 24 has an octagonal shape. In particular, in the exhaust gas purification filter 1 according to the first exemplary embodiment, the boundary line B is formed in a 4-fold rotational symmetry. FIG. 1 and FIG. 4 shows the boundary line B to connect the plural inlet cell holes 51 together which are arranged in an internal peripheral edge of the outer peripheral area 24. It is also acceptable for the boundary line B to connect the plural inlet cell holes 51 together, or the plural outlet cell holes 52 together, which are arranged at the outer peripheral edge in the central area 23. Those types of the boundary lines B previously described have a similarity and therefore have the same shape.

Figure 10:
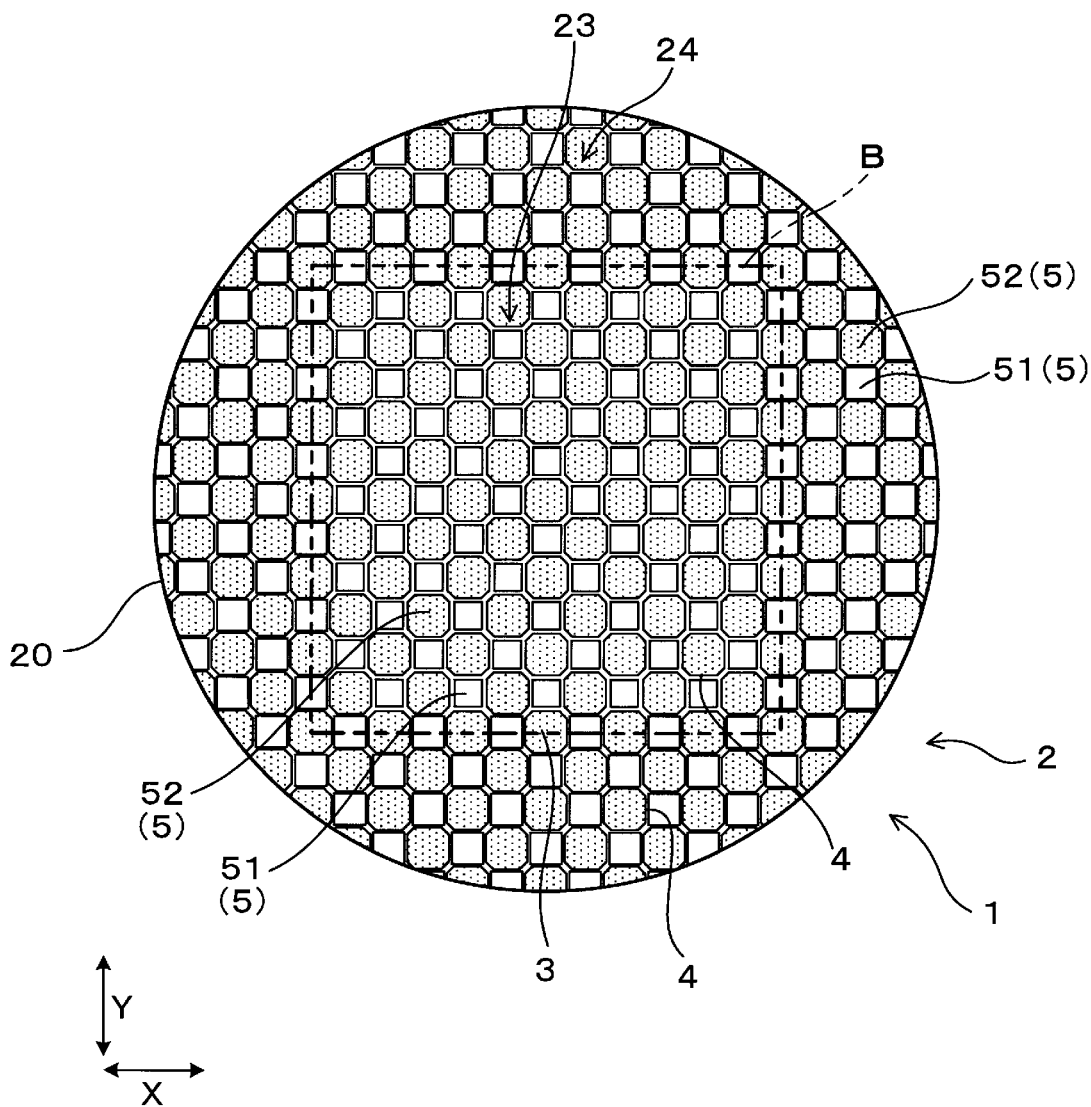
FIG. 10 is a plan view showing the exhaust gas purification filter having a boundary line of a square shape viewed from the axial direction of the exhaust gas purification filter according to a modification of the first exemplary embodiment of the present invention.

It is preferable for the boundary line B to have a rectangular shape shown in FIG. 10 which shows a modification of the first exemplary embodiment instead of an octagonal shape. When the boundary line B formed between the central area 23 and the outer peripheral area 24 has a rectangular shape, it is in particular preferable for the boundary line B to have a square shape. When the boundary line B has a rectangular shape, in particular a square shape, it is possible to easily produce the honeycomb structure body 2. That is, during production of metal dies, to be used for molding the honeycomb structure body 2, by using electric discharge machining, it is possible to use electrodes of a square shape to be used in the electric discharge machining. As a result, this can provide easy manufacturing of the honeycomb structure body 2 because of using the dies and electrodes having the same square shape.

On the other hand, when the boundary line B has an octagonal shape, does not a rectangular shape, it is hard to vary a distance between the boundary line B and the outer peripheral surface of the honeycomb structure body 2 due to a position in the peripheral direction of the honeycomb structure body 2. As a result, this has a tendency to easily increase withstand load of the exhaust gas purification filter 1 when the exhaust gas purification filter 1 is mounted to the inside of the exhaust gas pipe.

Figure 11:
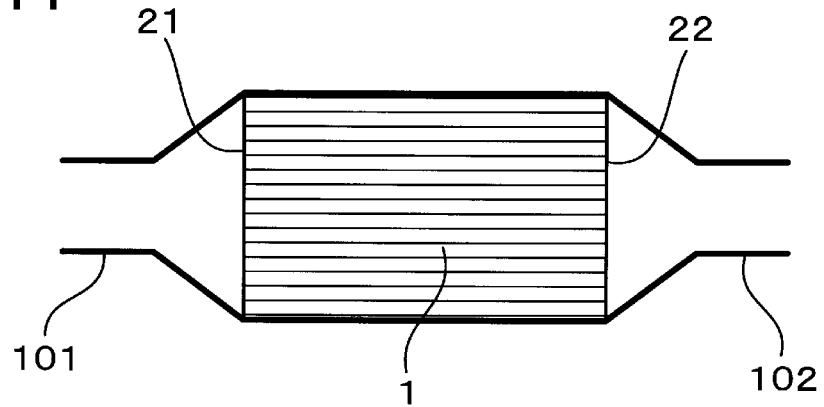
FIG. 11 is a view showing a cross section which explains an arrangement of the exhaust gas purification filter according to the first exemplary embodiment of the present invention mounted to an exhaust gas pipe.

It is also preferable for the boundary line B to have a structure and size in which an inscribed circle of the boundary line B is not more than an inside diameter of the exhaust gas pipe before or after the location of the exhaust gas purification filter 1. That is, as shown in FIG. 11, the exhaust gas purification filter 1 is mounted in the inside of the exhaust gas pipe. A pipe 101 and a pipe 102 are arranged at the location before and after the exhaust gas purification filter 1, where the inside diameter of the pipe 101 and the pipe 102 is smaller than the outer diameter of the exhaust gas purification filter 1. It is preferable to determine the diameter of the inscribed circle of the boundary line B which is not less than the inscribed diameter of the pipes 101 and 102. In particular, when viewed from the axial direction Z of the exhaust gas purification filter 1, it is preferable to arrange the inner circumferential edge of the pipes 101, 102 in the inside of the boundary line B. Further, it is preferable that the diameter of the inscribed circle of the boundary line B is not more than ¾ of the diameter of the honeycomb structure body 2. This structure makes it possible to keep the flow of the exhaust gas toward the outer peripheral area 24, and to suppress the pressure loss of the exhaust gas purification filter 1 from increasing.

It is not necessary that the boundary line B has a shape in a point symmetry and is also arranged at the position in the point symmetry around the central axis of the honeycomb structure body 2. For example, it is possible to change the position and shape of the boundary line B on the basis of a relative positional relationship between the exhaust gas purification filter 1 and the pipes arranged before and after the exhaust gas purification filter 1.

Further, it is acceptable for the exhaust gas purification filter 1 to support catalyst therein. That is, it is acceptable to have a structure in which cell walls 4 are coated with a three way catalyst which contains at least one kind of Pt, Rh and Pd. It is also possible to use cordierite, SiC (silicon carbide) and aluminum titanate so as to form the honeycomb structure body 2.

A description will now be given of action and effects of the exhaust gas purification filter 1 according to the first exemplary embodiment. As previously described, the exhaust gas purification filter 1 has the inlet cell holes 51 and the outlet cell holes 52. As shown in FIG. 2, exhaust gas G is introduced into the inside of the exhaust gas purification filter 1 through the inlet cells arranged at the upstream side of the exhaust gas purification filter 1. A part of the exhaust gas G passes through the cell walls 4 and enters to the inside of the outlet cell holes 52 by a pressure difference between the inlet cell holes 51 and the outlet cell holes 52. When the exhaust gas G passes through in the cell walls 4, particulate matter contained in the exhaust gas G is trapped and collected by the cell walls 4.

By the way, as previously described, when the exhaust gas flows at a high speed and the honeycomb structure body 2 does not have an adequate length, there is a possible problem in which a flow amount of the exhaust gas G, which passes directly through the inlet cell holes 51 and is discharged to the outside of the exhaust gas purification filter 1 without passing through the cell walls 4, increases. In general, a flow speed of exhaust gas around the central axis of the exhaust gas purification filter 1 easily increases when the exhaust gas is introduced from the upstream side end surface 21 of the exhaust gas purification filter 1. In this case, a flow amount of the exhaust gas G around the central axis of the exhaust gas purification filter 1, which passes directly through the inlet cell holes 51 and is discharged to the outside of the exhaust gas purification filter 1 without passing through the cell walls 4, easily increases. On the other hand, because the exhaust gas G, far from the central axis on the upstream side end surface 21 of the exhaust gas purification filter 1, has a low speed, all of the exhaust gas G penetrates the cell walls 4, and is discharged through the outlet cell holes 42 to the outside of the exhaust gas purification filter 1.

Accordingly, the exhaust gas purification filter 1 according to the first exemplary embodiment is formed so that the gas flow channel cross sectional area Sc1 of the inlet cell holes 51 in the central area 23 is smaller than the gas flow channel cross sectional area So1 of the inlet cell holes 51 in the outer peripheral area 24. This improved structure makes it possible to allow exhaust gas to easily flow in the outer peripheral area 24 when compared with that in a conventional exhaust gas purification filter having a uniform cell structure. Further, this improved structure makes it possible to reduce a pressure loss in the central area, and increase the collection rate of collecting particulate matter. Still further, because this improved structure allows an adequate amount of exhaust gas to flow in the outer peripheral area 24, and effectively uses the cell walls 4 in the outer peripheral area 24, it is possible to increase a filtering area of the overall exhaust gas purification filter 1, to maintain an adequate collection rate and to reduce the base length (i.e. the length in the axial direction Z) of the honeycomb structure body 2.

Further, the exhaust gas purification filter 1 according to the first exemplary embodiment is formed so that the first ratio Rc (=Sc1/Sc2) in the central area 23 is smaller than the second ratio Ro (=So1/So2) in the outer peripheral area 24, where the first ratio Rc is the ratio of the gas flow channel cross sectional area Sc1 of the inlet cell holes 51 to the gas flow channel cross sectional area Sc2 of the outlet cell holes 52 in the central area 23, and the second ratio Ro (So1/So2) is the ratio of the gas flow channel cross sectional area So1 of the inlet cell holes 51 to the gas flow channel cross sectional area So2 of the outlet cell holes 52 in the outer peripheral area 24. This improved structure makes it possible to effectively suppress variation in flow speed of exhaust gas in both the central area 23 and the outer peripheral area 24. As a result, this improved structure makes it possible to suppress exhaust gas from flowing without passing through the cell walls 4, and to reduce an overall size of the exhaust gas purification filter 1.

Further, as shown in FIG. 3 and FIG. 4, the exhaust gas purification filter 1 according to the first exemplary embodiment is formed so that the plural cell holes 5 are regularly arranged in the first direction X and the second direction Y in the central area 23 and the outer peripheral area 24, and the inlet cell holes 51 and the outlet cell holes 52 are alternately arranged in the first direction X and the second direction Y in the central area 23 and the outer peripheral area 24. The cell walls 4 in the central area 23 has a thickness which is thicker than that of the cell walls 4 in the outer peripheral area 24. This improved structure of the honeycomb structure body 2 makes it possible to prevent the arrangement structure of the cell holes 5 from being greatly changed. This improved structure makes it possible to avoid forming any boundary wall, which is different from the cell walls 4, between the central area 23 and the outer peripheral area 24. As a result, it is possible for the present invention to easily produce the exhaust gas purification filter 1 with low manufacturing cost. In addition, this improved structure makes it possible to suppress concentration of stress at the boundary part between the central area 23 and the outer peripheral area 24, and to therefore provide the exhaust gas purification filter 1 with superior durability.

Still further, as shown in FIG. 4 to FIG. 6, the exhaust gas purification filter 1 according to the first exemplary embodiment is formed so that the outlet cell holes 52 have an octagonal shape, and the inlet cell holes 52 have a square shape. This structure makes it possible to easily and alternately arrange the inlet cell holes 51 and the outlet cell holes 52.

Still further, as shown in FIG. 3, the exhaust gas purification filter 1 according to the first exemplary embodiment is formed so that the boundary line B formed between the central area 23 and the outer peripheral area 24 has an octagonal shape. This structure makes it possible to easily change the gas flow channel cross sectional area of the inlet cell holes 51 in each of the central area 23 and the outer peripheral area 24 without forming any boundary wall between the central area 23 and the outer peripheral area 24. In addition, because this improved structure makes it possible to approximately form the boundary line B in an approximately circular shape around the central axis of the honeycomb structure body 2, it is possible to suppress variation of flow speed of exhaust gas in the overall area of the honeycomb structure body 2 with high efficiency.

Still further, as shown in FIG. 4 to FIG. 6, the exhaust gas purification filter 1 according to the first exemplary embodiment is formed so that the central area 23 and the outer peripheral area 24 have the same gas flow channel cross sectional area Sc2, So2 of the outlet cell holes 52. That is, the honeycomb structure body 2 satisfies the relationship of Sc2=So2. This structure makes it possible to easily produce the exhaust gas purification filter 1 having a stable structure.

As previously described, the first exemplary embodiment provides the exhaust gas purification filter 1 having an increased collection rate of collecting particulate matter with a reduced size.

Second Exemplary Embodiment

Figure 12:
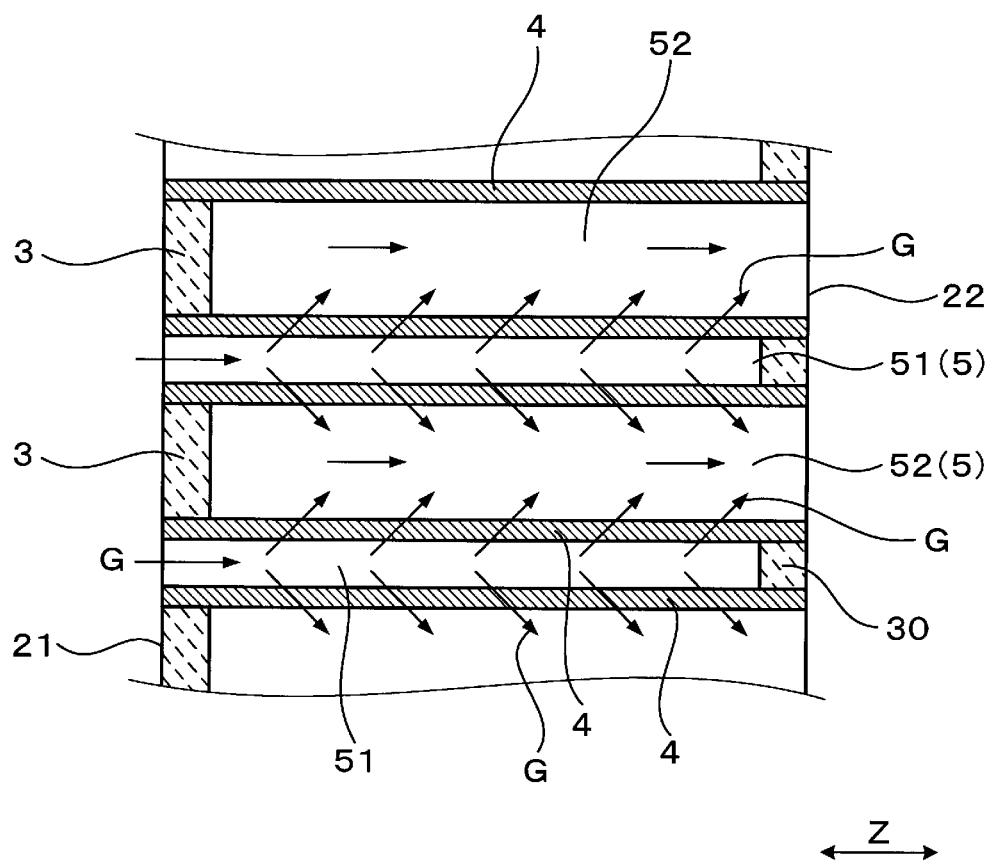
FIG. 12 is a view showing a cross section parallel to the axial direction of the exhaust gas purification filter according to a second exemplary embodiment of the present invention.
Figure 13:
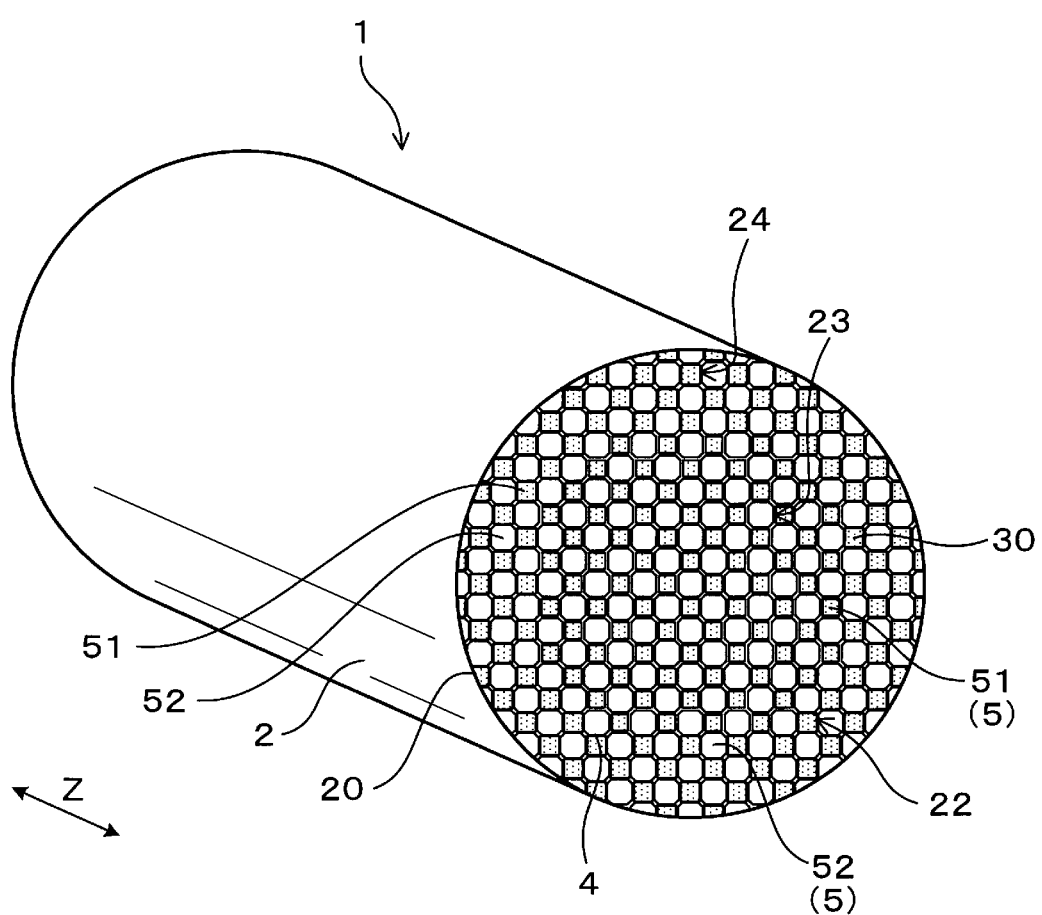
FIG. 13 is a perspective view showing the exhaust gas purification filter according to the second exemplary embodiment of the present invention when viewed from the downstream side end surface of the exhaust gas purification filter.
Figure 14:
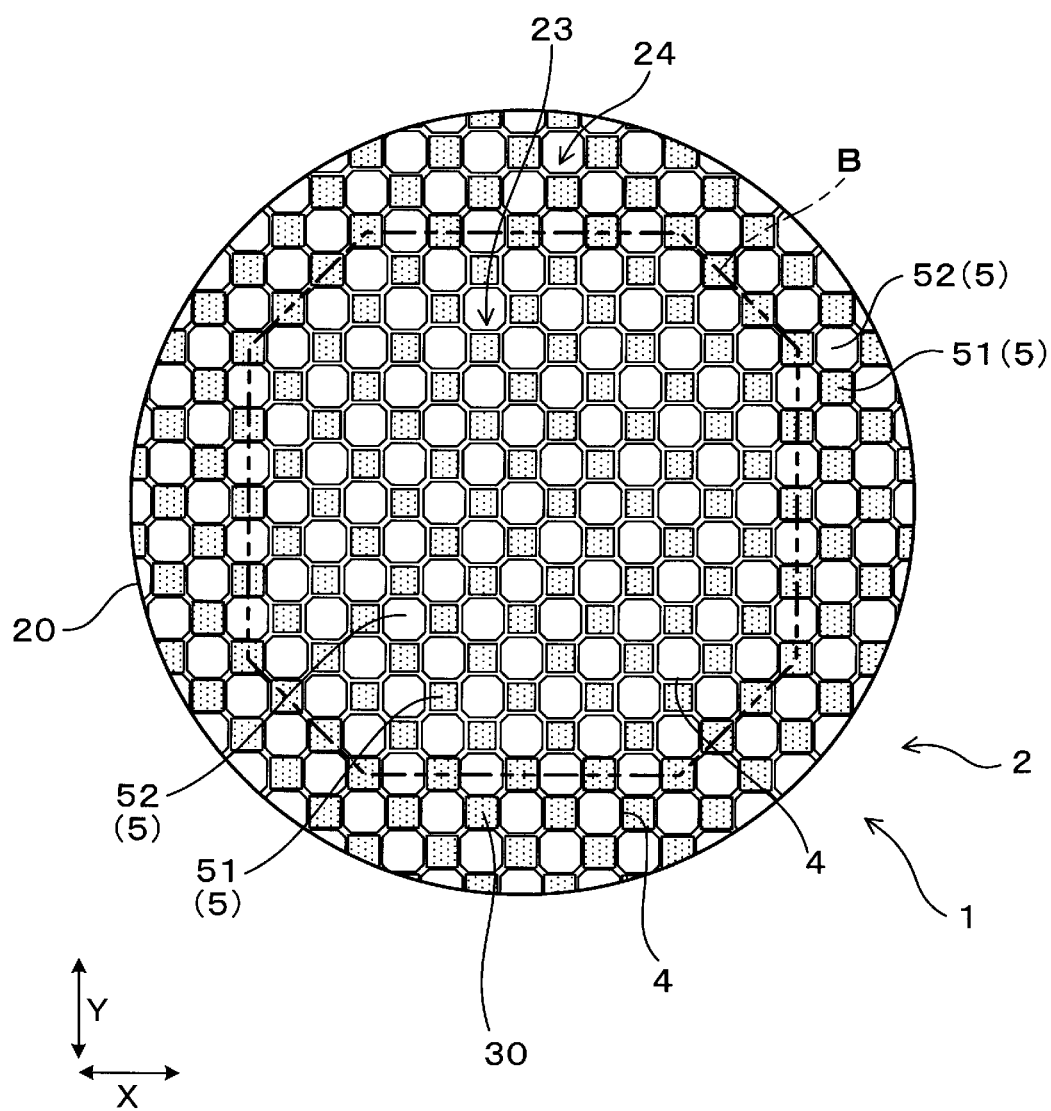
FIG. 14 is a plan view showing the exhaust gas purification filter according to the second exemplary embodiment of the present invention when viewed from the downstream side end surface of the exhaust gas purification filter.

Hereinafter, a description will be given of the exhaust gas purification filter 1 according to the second exemplary embodiment with reference to FIG. 12 to FIG. 14. As shown in FIG. 12 to FIG. 14, the exhaust gas purification filter 1 according to the second exemplary embodiment has a structure in which the downstream side end surface 22 of the inlet cell holes 51 are plugged by the downstream side plug members 30. That is, the exhaust gas purification filter 1 according to the second exemplary embodiment has the downstream side plug members 30 with which a some parts on the downstream side end surface 22 of the honeycomb structure body 2 are plugged. Further, the inlet cell holes 51 on the downstream side end surface 22 are plugged by the downstream side plug members 30.

Other components of the exhaust gas purification filter 1 according to the second exemplary embodiment have the same structure and behavior of the components of the exhaust gas purification filter 1 according to the first exemplary embodiment, and referred with the same reference numbers and characters.

The structure of the exhaust gas purification filter 1 according to the second exemplary embodiment can prevent exhaust gas G entered into the inside of the inlet cell holes 51 from is discharged to the outside through the downstream side end surface 22 of the inlet cell holes 51 without passing through the cell walls 4. In addition to this effect, the exhaust gas purification filter 1 according to the second exemplary embodiment has the same effects and behavior of the exhaust gas purification filter 1 according to the first exemplary embodiment.

First Experiment

The first experiment produced exhaust gas purification filters having different plural structures, and detected a pressure loss of exhaust gas and a collection rate of particulate matter by each of the exhaust gas purification filters. The first experiment prepared samples 1 to 4 having the same basic structure of the exhaust gas purification filter 1 according to the first exemplary embodiment in which the plug members were formed and arranged only on one end surface of the honeycomb structure body 2. The four samples 1 to 4 had a different opening width (mm) of the outlet cell holes 52 in the outer peripheral area 24. The samples 1 to 4 as the exhaust gas purification filters had the boundary line B of a square shape, as shown in FIG. 10. The boundary line B had a square shape having a 60 mm square. Table 1 shows each dimension of the four samples 1 to 4.

TABLE 1

| SAMPLE No. | CENTRAL SIDE AREA | | | | | | OUTER PERIPHERAL SIDE AREA | |
|---|---|---|---|---|---|---|---|---|
| | THICKNESS (mm) OF CELL WALL | OPENING WIDTH (mm) | | GAS FLOW CHANNEL CROSS SECTIONAL AREA (mm$^2$) | | AREA RATIO | THICKNESS (mm) OF CELL WALL | OPENING WIDTH (mm) |
| | | INLET CELL HOLE | OUTLET CELL HOLE | Sc1 | Sc2 | Rc | | INLET CELL HOLE |
| 1 | 0.25 | 1.08 | 1.43 | 1.17 | 1.98 | 0.59 | 0.22 | 1.17 |
| 2 | 0.25 | 1.08 | 1.43 | 1.17 | 1.98 | 0.59 | 0.20 | 1.18 |
| 3 | 0.25 | 1.08 | 1.43 | 1.17 | 1.98 | 0.59 | 0.18 | 1.20 |
| 4 | 0.25 | 1.08 | 1.43 | 1.17 | 1.98 | 0.59 | 0.21 | 1.20 |

| SAMPLE No. | OUTER PERIPHERAL SIDE AREA | | | | | |
|---|---|---|---|---|---|---|
| | OPENING WIDTH (mm) OUTLET CELL HOLE | GAS FLOW CHANNEL CROSS AREA (mm$^2$) | | AREA RATIO | COLLECTION RATE (%) | PRESSURE LOSS (kPa) |
| | | Sc1 | Sc2 | Ro | | |
| 1 | 1.40 | 1.36 | 1.94 | 0.7 | 52.1 | 0.89 |
| 2 | 1.43 | 1.40 | 2.00 | 0.7 | 50.9 | 0.82 |

TABLE 1-continued

| | | | | | | |
|---|---|---|---|---|---|---|
| 3 | 1.45 | 1.45 | 2.07 | 0.7 | 50.4 | 0.79 |
| 4 | 1.41 | 1.38 | 1.98 | 0.7 | 51.4 | 0.85 |

Further, the first experiment used the honeycomb structure body 2 as Samples 1 to 4 having a cylindrical shape having a diameter of 118.4 mm, a length of 118 mm in the axial direction Z, and a cell pitch of 1.505 mm.

The first experiment further prepared samples 5 to 13 having the same cell structure in both the central area 23 and the outer peripheral area 24. The samples 5 to 13 had the same outer size of the samples 1 to 4. Table 2 shows various parameters of the samples 5 to 13.

different electrode structures because the central area is different in shape from the outer peripheral area. After this, a slurry was injected to the metal die having a checkered pattern at the upstream side end surface of the honeycomb structure body molded by using such metal die. This produced the plug members at predetermined pattern on the upstream side end surface of the honeycomb structure body. The honeycomb structure body having the plug members was fired in a furnace at 1430° C. for 20 hours.

TABLE 2

| | | OVERALL AREA | | | | | |
|---|---|---|---|---|---|---|---|
| | THICKNESS | OPENING WIDTH (mm) | | GAS FLOW CHANNEL CROSS SECTIONAL AREA (mm²) | | | PRESSURE |
| SAMPLE No. | (mm) OF CELL WALL | INLET CELL HOLE | OUTLET CELL HOLE | INLET CELL HOLE | OUTLET CELL HOLE | AREA RATIO | COLLECTION RATE (%) | LOSS (kPa) |
| 5 | 0.20 | 1.14 | 1.47 | 1.31 | 2.10 | 0.62 | 48.1 | 0.82 |
| 6 | 0.20 | 1.10 | 1.51 | 1.20 | 2.20 | 0.55 | 51.3 | 0.89 |
| 7 | 0.20 | 1.06 | 1.55 | 1.12 | 2.29 | 0.49 | 54.3 | 0.96 |
| 8 | 0.25 | 1.08 | 1.43 | 1.17 | 1.98 | 0.59 | 53.6 | 0.98 |
| 9 | 0.25 | 1.05 | 1.46 | 1.10 | 2.05 | 0.53 | 57.3 | 1.06 |
| 10 | 0.25 | 1.01 | 1.5 | 1.02 | 2.13 | 0.48 | 60.7 | 1.16 |
| 11 | 0.15 | 1.21 | 1.5 | 1.47 | 2.2 | 0.67 | 39.6 | 0.66 |
| 12 | 0.15 | 1.11 | 1.6 | 1.22 | 2.45 | 0.5 | 46.3 | 0.79 |
| 13 | 0.15 | 1.02 | 1.69 | 1.05 | 2.62 | 0.4 | 51.1 | 0.95 |

The pressure loss and the collection rate depend on an outer diameter, a length, a size of the outlet cell holes, the size of the inlet cell holes, a thickness (mm) of the cell walls, a cell pitch, pore characteristics (i.e. an average pore size, and a pore ratio). For this reason, the first experiment prepared the samples 1 to 13 which had the fixed diameter, the fixed length, the fixed cell pitch, and the same pore characteristics. The fixed parameters will be explained later, and the outer diameter and the length of the honeycomb structure body as each sample are previously described. As shown in FIG. 5, the cell pitch p is calculated by adding an average value of a width of the outlet cell hole 52 and a width of the inlet cell hole 51 to a thickness of the cell wall. That is, it is possible to define the cell pitch p which is a half of the length 2p shown in FIG. 5. The average pore size of the cell walls was 18 μm, the pore ratio of 60%.

The sample 1 to 13 were produced by using materials and a method as follows. At first, the honeycomb structure body was made of cordierite as main material having a chemical composition of 45 to 55 weight % of $SiO_2$, 33 to 42 weight % of $Al_2O_3$, and 12 to 18 weight % of MgO. The first experiment used a mixture composed of at least three kinds of raw materials selected from kaolin, silica, porous silica, talc, aluminum hydroxide, alumina, water, lubricant, binder, etc. were added to the mixture, and further mixed, molded, and dried so as to produce the honeycomb structure body.

The first experiment produced metal dies to be used in the molding process of the honeycomb structure body. That is, the metal dies to be used for producing the samples 5 to 13 were produced by an electric discharge machining which used electrodes having the same structure. On the other hand, the dies to be used for producing the samples 1 to 4 were produced by the electric discharge machining by using As shown in Table 1 and Table 2, the samples 1 to 13 having a different inlet cell hole size and a different size of the cell wall. The first experiment measured its pressure loss and collection rate of each of the samples 1 to 13. The evaluation method will be explained.

In the first experiment, the exhaust gas purification filter as each of the samples 1 to 13 was mounted to a gasoline direct injection engine. The first experiment detected a pressure difference between the inlet side and the outlet side of the exhaust gas purification filter as each of the samples 1 to 13 so as to detect a pressure loss. Further, the first experiment detected the number of particulate matter contained in exhaust gas at a location before the exhaust gas purification filter and a location after the exhaust gas purification filter so as to detect a collection rate of each of the samples 1 to 13. The first experiment used exhaust gas having a flow amount of 2.76 m³/minute at a temperature of 450° C.

Figure 15:
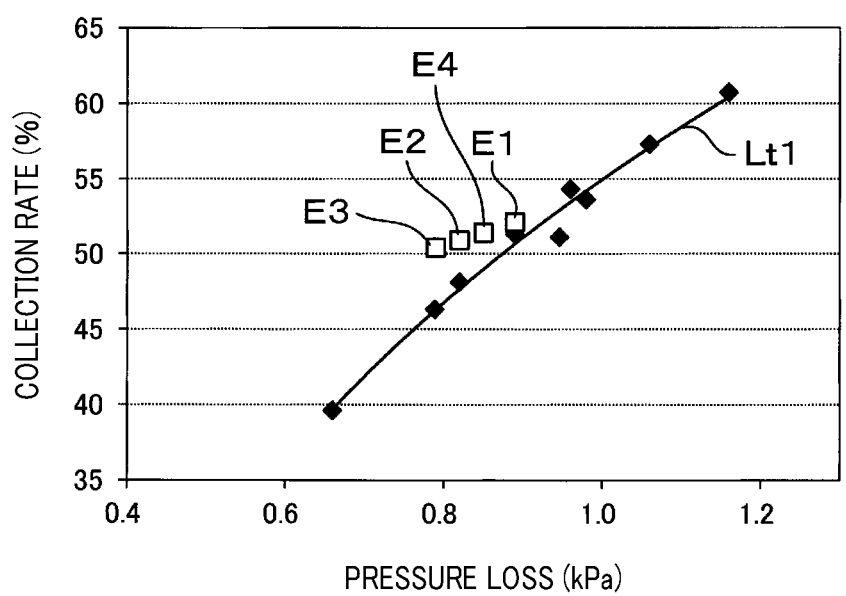
FIG. 15 is a graph showing measurement results of a pressure loss and a collection rate of exhaust gas purification filters in a first experiment according to the present invention.

Table 1 and Table 2 show the detection result and evaluation results of the first experiment. Further, FIG. 15 shows a relationship between the pressure loss (kPa) and the collection rate of each sample according to the first experiment. In FIG. 15, the samples 1 to 4 correspond to reference characters E1, E2, E3 and E4, respectively. Other dotted points show detection results of the samples 5 to 13. FIG. 15 shows the detection results of the samples 5 to 13 in which the pressure loss increases according to increase of the collection rate. As shown in FIG. 15, it is possible to connect the detection results of the samples 5 to 13 by using a tradeoff line Lt1 which is approximated curve. That is, it can be recognized that the relationship between the collection rate and the pressure loss is a tradeoff relationship in which the collection rate increases according to increasing of the pressure loss, and the collection rate is reduced according to the reduction of the pressure loss.

On the other hand, it can be recognized that the detection results E1 to E4 of the samples 1 to 4 have a high collection rate which are present above the tradeoff line Lt1. That is, the samples 1 to 4 have an improved collection rate while suppressing the pressure loss. In particular, the detection results E2, E3 and E4 of the samples 2, 3 and 4 in the samples 1 to 4 are drastically separated from the tradeoff line Lt1. The sample 1 has the relationship of Sc2>So2, and the samples 2 and 3 satisfy a relationship of Sc2<So2, and the sample E4 satisfies the relationship of Sc2=So2.

The detection results of the first experiment show that it is preferable for the exhaust gas purification filter according to the first exemplary embodiment to have the improved collection rate while suppressing the pressure loss. In particular, it is preferable for the exhaust gas purification filter according to the first exemplary embodiment to satisfy the relationship of Sc2<=So2.

Second Experiment

The second experiment detected a relationship between the pressure loss of exhaust gas passing through the exhaust gas purification filter and the collection rate of collecting particulate matter contained in the exhaust gas. The second experiment prepared samples 21 to 24 which had the base structure of the exhaust gas purification filter 1 shown by the second exemplary embodiment and had four different opening widths of the outlet cell holes 52 in the outer peripheral area 24. The samples 21 to 24 as the exhaust gas purification filter 1 had the boundary line B of a square shape, as shown in FIG. 10. This boundary line B has a square shape of 60 mm square. Table 3 shows the parameters of each of the samples 21 to 24.

TABLE 3

| SAMPLE No. | CENTRAL SIDE AREA | | | | | | OUTER PERIPHERAL SIDE AREA | |
|---|---|---|---|---|---|---|---|---|
| | THICKNESS (mm) OF CELL WALL | OPENING WIDTH (mm) | | GAS FLOW CHANNEL CROSS SECTIONAL AREA (mm$^2$) | | AREA RATIO | THICKNESS (mm) OF CELL WALL | OPENING WIDTH (mm) |
| | | INLET CELL HOLE | OUTLET CELL HOLE | Sc1 | Sc2 | Rc | | INLET CELL HOLE |
| 21 | 0.25 | 1.10 | 1.41 | 1.21 | 1.94 | 0.62 | 0.22 | 1.18 |
| 22 | 0.25 | 1.10 | 1.41 | 1.21 | 1.94 | 0.62 | 0.20 | 1.20 |
| 23 | 0.25 | 1.10 | 1.41 | 1.21 | 1.94 | 0.62 | 0.18 | 1.21 |
| 24 | 0.25 | 1.10 | 1.41 | 1.21 | 1.94 | 0.62 | 0.21 | 1.19 |

| SAMPLE No. | OUTER PERIPHERAL SIDE AREA | | | | | |
|---|---|---|---|---|---|---|
| | OPENING WIDTH (mm) OUTLET CELL HOLE | GAS FLOW CHANNEL CROSS SECTIONAL AREA (mm$^2$) | | AREA RATIO Ro | COLLECTION RATE (%) | PRESSURE LOSS (kPa) |
| | | Sc1 | Sc2 | | | |
| 21 | 1.39 | 1.39 | 1.92 | 0.72 | 78.1 | 0.97 |
| 22 | 1.41 | 1.43 | 1.98 | 0.72 | 76.3 | 0.89 |
| 23 | 1.44 | 1.47 | 2.04 | 0.72 | 75.5 | 0.86 |
| 24 | 1.40 | 1.41 | 1.94 | 0.72 | 77.2 | 0.92 |

The second experiment further prepared samples 25 to 29 having the same cell structure in both the central area 23 and the outer peripheral area 24. The samples 25 to 29 had the same outer size of the samples 21 to 29. Table 4 shows various parameters of the samples 25 to 29.

TABLE 4

| SAMPLE No. | OVERALL AREA | | | | | | | |
|---|---|---|---|---|---|---|---|---|
| | THICKNESS (mm) OF CELL WALL | OPENING WIDTH (mm) | | GAS FLOW CHANNEL CROSS SECTIONAL AREA (mm$^2$) | | AREA RATIO | COLLECTION RATE (%) | PRESSURE LOSS (kPa) |
| | | INLET CELL HOLE | OUTLET CELL HOLE | INLET CELL HOLE | OUTLET CELL HOLE | | | |
| 25 | 0.20 | 1.25 | 1.36 | 1.55 | 1.85 | 0.83 | 72.1 | 0.89 |
| 26 | 0.25 | 1.20 | 1.31 | 1.43 | 1.72 | 0.83 | 79.7 | 1.08 |
| 27 | 0.25 | 1.15 | 1.36 | 1.32 | 1.83 | 0.72 | 82.1 | 1.23 |
| 28 | 0.25 | 1.10 | 1.41 | 1.21 | 1.94 | 0.62 | 84.5 | 1.42 |
| 29 | 0.22 | 1.23 | 1.34 | 1.50 | 1.80 | 0.83 | 74.9 | 0.96 |

The samples 21 to 29 according to the second experiment had the same parameters of the samples 1 to 13 according to the first experiment. The second experiment used the same method of producing each sample and the evaluation and detection method of the first experiment unless otherwise indicated.

Figure 16:
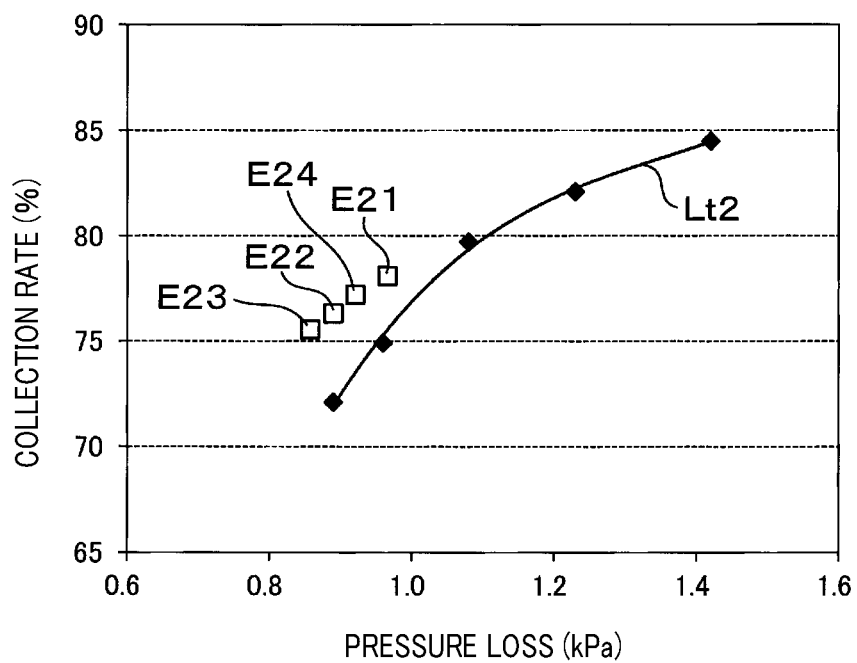
FIG. 16 is a graph showing measurement results of a pressure loss and a collection rate of exhaust gas purification filters in a second experiment according to the present invention.

Table 3 and Table 4 show the detection results and evaluation results of the samples. FIG. 16 shows a relationship between the pressure loss (kPa) and the collection rate of each sample according to the second experiment. In FIG. 16, the samples 21 to 24 correspond to reference characters E21, E22, E23 and E24, respectively. Other dotted points show detection results of the samples 25 to 29. FIG. 16 shows the detection results of the samples 25 to 29 in which the pressure loss increases according to increase of the collection rate. As shown in FIG. 16, it is possible to connect the detection results of the samples 25 to 29 by using a tradeoff line Lt2 of a curved shape. That is, it can be recognized that the relationship between the collection rate and the pressure loss is a tradeoff relationship in which the collection rate increases according to increasing of the pressure loss, and the collection rate is reduced according to the reduction of the pressure loss.

On the other hand, it can be recognized that the detection results E21 to E24 of the samples 21 to 24 have a high collection rate which are present above the tradeoff line Lt2. That is, the samples 21 to 24 have an improved collection rate while suppressing increasing of the pressure loss. In particular, the detection results E22, E23 and E24 of the samples 22, 23 and 24 in the samples 21 to 24 are drastically separated from the tradeoff line Lt2. The sample 21 satisfies the relationship of Sc2>So2, and the samples 22 and 23 satisfy the relationship of Sc2<So2, and the sample E24 satisfies the relationship of Sc2=So2.

The detection results of the second experiment show that it is preferable for the exhaust gas purification filter according to the second exemplary embodiment to have the improved collection rate while suppressing the pressure loss. In particular, it is preferable for the exhaust gas purification filter according to the second exemplary embodiment to satisfy the relationship of Sc2<=So2.

The concept of the present invention is not limited by the exhaust gas purification filters according to the first and second exemplary embodiments previously described. It is possible to apply the concept of the present invention to various applications. For example, the first exemplary embodiment shows the exhaust gas purification filter 1 having the structure in which the inlet cell holes 51 have a rectangular shape, and the outlet cell holes 52 have an octagonal shape. However, the concept of the present invention is not limited by this structure. It is also acceptable for the exhaust gas purification filter 1 to have a structure in which both the inlet cell holes and the outlet cell holes have a square shape (i.e. a square shape). In this structure, it is preferable for each outlet cell hole to have rounded corners. It is further acceptable for the exhaust gas purification filter to have the outlet cell holes having a different gas flow channel cross sectional area in the central area and the outer peripheral area. In this structure, it is preferable to have a structure in which the gas flow channel cross sectional area of the outlet cell holes in the central area is smaller than that of the outlet cell holes in the outer peripheral area.

REFERENCE SIGNS LIST

1 Exhaust gas purification filter, 2 Honeycomb structure body, 21 Upstream side end surface, 23 Central area, 24 Outer peripheral area, 3 Upstream side plug members, 5 Cell holes, 51 Inlet cell holes, and 52 Outlet cell holes.

The invention claimed is:

1. An exhaust gas purification filter for trapping and collecting particulate matter contained in exhaust gas, comprising:
   a honeycomb structure body;
   upstream side plug members, arranged on an upstream side end surface in an axial direction of the honeycomb structure body, plug some of a plurality of cell holes of the honeycomb structure body, the cell holes acting as gas flow channels,
   wherein the honeycomb structure body comprises a plurality of cell walls, and the plurality of cell holes being surrounded by the plurality of cell walls,
   the plurality of cell holes comprises inlet cell holes and outlet cell holes,
      wherein the inlet cell holes on the upstream side end surface of the honeycomb structure body are open, and the outlet cell holes on the upstream side end surface of the honeycomb structure body are plugged by the upstream side plug members, and the outlet cell holes on a downstream side end surface of the honeycomb structure body are open,
   wherein the honeycomb structure body comprises a central area including a central axis of the honeycomb structure body and an outer peripheral area arranged at the outer peripheral side of the central area,
   in each of the central area and the outer peripheral area, a gas flow channel cross sectional area of the outlet cell holes is larger than a gas flow channel cross sectional area of the inlet cell holes, and
   the gas flow channel cross sectional area of the inlet cell holes in the central area is smaller than the gas flow channel cross sectional area of the inlet cell holes in the outer peripheral area, and
   a first ratio Rc in the central area is smaller than a second ratio Ro in the outer peripheral area, wherein the first ratio Rc is a ratio of the gas flow channel cross sectional area of the inlet cell holes to the gas flow channel cross sectional area of the outlet cell holes in the central area, and the second ratio Ro is a ratio of the gas flow channel cross sectional area of the inlet cell holes to the gas flow channel cross sectional area of the outlet cell holes in the outer peripheral area,
   wherein when viewed along the axial direction of the honeycomb structure body, the plurality of cell holes are arranged in a first direction and a second direction, which are perpendicular with each other, in the central area and the outer peripheral area,
   the inlet cell holes and the outlet cell holes are alternately arranged in the first direction and the second direction, and
   a thickness of the plurality of cell walls in the central area is thicker than a thickness of the plurality of cell walls in the outer peripheral area.

2. The exhaust gas purification filter according to claim 1, wherein the plurality of cell holes are arranged with a constant cell pitch in the central area and the outer peripheral area in the honeycomb structure body.

3. The exhaust gas purification filter according to claim 1, wherein the gas flow channel cross sectional area of the outlet cell holes in the central area is not more than the gas flow channel cross sectional area of the outlet cell holes in the outer peripheral area.

4. The exhaust gas purification filter according to claim 3, wherein when viewed along the axial direction of the honeycomb structure body, each of the outlet cell holes has an octagonal shape, and each of the inlet cell holes has a square shape.

5. The exhaust gas purification filter according to claim 1, wherein when viewed along the axial direction (Z) of the honeycomb structure body, a boundary line between the central area and the outer peripheral area has an octagonal shape.

6. The exhaust gas purification filter according to claim 1, wherein the plurality of cell walls in the central area have a thickness within a range of 0.15 to 0.35 mm, and the plurality of cell walls in the outer peripheral area, each has a thickness within a range of 0.10 to 0.30 mm.

7. The exhaust gas purification filter according to claim 2, wherein the plurality of cell holes are arranged with the constant cell pitch within a range of 1.14 to 2.54 mm in the central area and the outer peripheral area in the honeycomb structure body.

\* \* \* \* \*